United States Patent
Kabeya

(10) Patent No.: US 12,229,021 B2
(45) Date of Patent: Feb. 18, 2025

(54) BACKUP MANAGEMENT DEVICE AND BACKUP DESTINATION MIGRATION METHOD

(71) Applicant: Hitachi, Ltd., Tokyo (JP)

(72) Inventor: Yuma Kabeya, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 2 days.

(21) Appl. No.: 18/454,431

(22) Filed: Aug. 23, 2023

(65) Prior Publication Data
US 2024/0248809 A1 Jul. 25, 2024

(30) Foreign Application Priority Data
Jan. 25, 2023 (JP) .................................. 2023-009734

(51) Int. Cl.
*G06F 11/14* (2006.01)
(52) U.S. Cl.
CPC ...... *G06F 11/1464* (2013.01); *G06F 11/1451* (2013.01)
(58) Field of Classification Search
CPC ............. G06F 11/1451; G06F 11/1461; G06F 11/1464
See application file for complete search history.

(56) References Cited

U.S. PATENT DOCUMENTS

| | | | | |
|---|---|---|---|---|
| 10,083,094 | B1* | 9/2018 | Thomas | G06F 11/1466 |
| 2020/0019465 | A1* | 1/2020 | Khan | G06F 11/1461 |
| 2022/0413967 | A1* | 12/2022 | Bhagi | G06F 11/3055 |

FOREIGN PATENT DOCUMENTS

WO 2015/181937 A1 12/2015

* cited by examiner

*Primary Examiner* — Aracelis Ruiz
(74) *Attorney, Agent, or Firm* — Volpe Koenig

(57) ABSTRACT

A data storage system where the cost required to change a configuration of a system and the burden on an administrator are reduced, the capacity of a backup device is effectively utilized, and the backup processing is optimized. When conditions related to a capacity resource specified in a backup requirement table cannot be satisfied, predicted resource consumption when the data of a backup target in a task is backed up to other destinations is calculated using an existing backup information table, a score representing a low impact on the resource when migrating to the other backup destinations is calculated on the basis of the predicted resource consumption, a backup destination as a migration destination of the backup related to the task is determined on the basis of the score, and a backup schedule table is updated such that the determined backup destination becomes the backup destination related to the task.

11 Claims, 23 Drawing Sheets

FIG.7

BACKUP DESTINATION SPECIFICATION TABLE 200

| BACKUP DESTINATION ID (200a) | BACKUP DESTINATION TYPE (200b) | ATTRIBUTE NAME (200c) | ATTRIBUTE VALUE (200d) |
|---|---|---|---|
| STORAGE DEVICE A | STORAGE | RESTORATION PERFORMANCE | 0.1 GB CAN BE RESTORED PER MINUTE |
| | | MAXIMUM CAPACITY RESOURCE | 1000GB |
| | | CURRENT CONSUMED CAPACITY RESOURCE | 750GB |
| | | ... | ... |
| STORAGE DEVICE B | STORAGE | RESTORATION PERFORMANCE | 0.24 GB CAN BE RESTORED PER MINUTE |
| | | MAXIMUM CAPACITY RESOURCE | 2000GB |
| | | CURRENT CONSUMED CAPACITY RESOURCE | 600GB |
| | | CAPACITY REDUCTION PERFORMANCE | 80% |
| | | BASIC CONSUMED MEMORY | 1GB |
| | | CAPACITY-DEPENDENT CONSUMED MEMORY | 1 GB PER DIFFERENTIAL DATA ACCUMULATION AMOUNT OF 1 GB |
| | | MAXIMUM MEMORY | 128GB |
| | | CURRENT CONSUMED MEMORY | 32GB |
| | | UNIQUE CORRECTION SCORE | 0 |
| | | ... | ... |
| STORAGE DEVICE C | STORAGE | RESTORATION PERFORMANCE | 0.2 GB CAN BE RESTORED PER MINUTE |
| | | MAXIMUM CAPACITY RESOURCE | 1000GB |
| | | CURRENT CONSUMED CAPACITY RESOURCE | 200GB |
| | | CAPACITY REDUCTION PERFORMANCE | 80% |
| | | BASIC CONSUMED MEMORY | 1GB |
| | | CAPACITY-DEPENDENT CONSUMED MEMORY | 2 GB PER DIFFERENTIAL DATA ACCUMULATION AMOUNT OF 1 GB |
| | | MAXIMUM MEMORY | 64GB |
| | | CURRENT CONSUMED MEMORY | 32GB |
| | | UNIQUE CORRECTION SCORE | -100 |
| | | ... | ... |
| CLOUD AREA D | CLOUD | RESTORATION PERFORMANCE | 0.1 GB CAN BE RESTORED PER MINUTE |
| | | UPPER-LIMIT CLOUD COST | 250000 YEN/MONTH |
| | | CURRENT CONSUMED CLOUD COST | 70000 YEN/MONTH |
| | | CAPACITY-DEPENDENT CLOUD COST | 200 YEN/MONTH·GB |
| | | UNIQUE CORRECTION SCORE | 0 |
| | | ... | ... |
| ... | | ... | ... |

FIG.8

BACKUP REQUIREMENT TABLE    201

| BACKUP REQUIREMENT KIND | BACKUP REQUIREMENT ITEM | BACKUP REQUIREMENT CONTENT | TARGET SYSTEM RESOURCE ID |
|---|---|---|---|
| 201a | 201b | 201c | 201d |
| IT INFRASTRUCTURE REQUIREMENT | CAPACITY RESOURCE USE RATE | USE RATE OF CAPACITY RESOURCE OF TARGET BACKUP DESTINATION MUST BE 80% OR LESS | STORAGE DEVICE A, STORAGE DEVICE B, ... |
| | | ... | ... |
| | BACKUP FREQUENCY | SUPPRESS BACKUP TO TARGET BACKUP DESTINATION WHEN VM/ PHYSICAL SERVER OF BACKUP TARGET IS STOPPED | STORAGE DEVICE A, STORAGE DEVICE B, ... |
| | | ... | ... |
| | ... | ... | ... |
| USER REQUIREMENT | RPO | MUST BE RECOVERABLE TO STATE 1 HOUR BEFORE FROM TIME WHEN FAILURE OCCURRED IN BACKUP TARGET | VM1, VM2, ... PHYSICAL SERVER 1, ... |
| | | MUST BE RECOVERABLE TO STATE 30 MINUTES BEFORE FROM TIME WHEN FAILURE OCCURRED IN BACKUP TARGET | VM3, VM4, ... PHYSICAL SERVER 2, ... |
| | | ... | ... |
| | RTO | MUST BE RECOVERABLE TO STATE 7 MINUTES BEFORE FROM TIME WHEN FAILURE OCCURRED IN BACKUP TARGET | VM1, VM2, ... PHYSICAL SERVER 1, ... |
| | | ... | ... |
| | BACKUP STORAGE PERIOD | BACKUP OF BACKUP TARGET MUST BE STORABLE FOR 5 DAYS | VM1, VM2, ... PHYSICAL SERVER 1, ... |
| | | ... | ... |
| | ... | ... | ... |

FIG. 9

EXISTING BACKUP INFORMATION TABLE 202

| SYSTEM RESOURCE ID (202a) | BACKUP CAPACITY KIND (202b) | BACKUP CAPACITY VALUE (202c) |
|---|---|---|
| VM1 | CURRENT TOTAL FULL BACKUP CAPACITY | 200GB |
| | CURRENT TOTAL DIFFERENTIAL BACKUP CAPACITY | 2.4GB |
| | AVERAGE FULL BACKUP CAPACITY | 20GB |
| VM2 | CURRENT TOTAL FULL BACKUP CAPACITY | 100GB |
| | CURRENT TOTAL DIFFERENTIAL BACKUP CAPACITY | 4.8GB |
| | AVERAGE FULL BACKUP CAPACITY | 10GB |
| ... | ... | ... |
| PHYSICAL SERVER 1 | CURRENT TOTAL FULL BACKUP CAPACITY | 300GB |
| | CURRENT TOTAL DIFFERENTIAL BACKUP CAPACITY | 12GB |
| | AVERAGE FULL BACKUP CAPACITY | 50GB |
| ... | ... | ... |

FIG.10

BACKUP SCHEDULE TABLE  203

| | 203a | 203b | 203c | 203d | 203e |
|---|---|---|---|---|---|
| | TASK ID | BACKUP TARGET ID | BACKUP DESTINATION ID | BACKUP TYPE | TASK EXECUTION TIME |
| | ⋮ | ⋮ | ⋮ | ⋮ | ⋮ |
| | TASK 1 | VM2 | STORAGE DEVICE B | FULL BACKUP | 2022/1/1 12:00 |
| | TASK 2 | VM2 | STORAGE DEVICE B | DIFFERENTIAL BACKUP | 2022/1/1 12:48 |
| | TASK 3 | VM2 | STORAGE DEVICE B | DIFFERENTIAL BACKUP | 2022/1/1 13:36 |
| | TASK 4 | VM2 | STORAGE DEVICE B | DIFFERENTIAL BACKUP | 2022/1/1 14:24 |
| | TASK 5 | VM2 | STORAGE DEVICE B | DIFFERENTIAL BACKUP | 2022/1/1 15:12 |
| | TASK 6 | VM2 | STORAGE DEVICE B | DIFFERENTIAL BACKUP | 2022/1/1 16:00 |
| | TASK 7 | VM2 | STORAGE DEVICE B | FULL BACKUP | 2022/1/1 16:48 |
| | TASK 8 | VM2 | STORAGE DEVICE B | DIFFERENTIAL BACKUP | 2022/1/1 17:36 |
| | TASK 9 | VM2 | STORAGE DEVICE B | DIFFERENTIAL BACKUP | 2022/1/1 18:24 |
| | TASK 10 | VM2 | STORAGE DEVICE B | DIFFERENTIAL BACKUP | 2022/1/1 19:12 |
| | ⋮ | ⋮ | ⋮ | ⋮ | ⋮ |
| | TASK 101 | VM3 | CLOUD AREA D | FULL BACKUP | 2022/1/1 12:00 |
| | ⋮ | ⋮ | ⋮ | ⋮ | ⋮ |
| | TASK 201 | PHYSICAL SERVER 1 | STORAGE DEVICE A | FULL BACKUP | 2022/1/1 12:00 |
| | ⋮ | ⋮ | ⋮ | ⋮ | ⋮ |

FIG.11

MIGRATION DESTINATION ASSUMED   204
BACKUP INFORMATION TABLE

| 204a | 204b | 204c | 204d | 204e |
|---|---|---|---|---|
| BACKUP TARGET ID | MIGRATION DESTINATION CANDIDATE ID | BACKUP DESTINATION TYPE | ASSUMED BACKUP CONTENT KIND | ASSUMED BACKUP CONTENT VALUE |
| VM2 | STORAGE DEVICE B | STORAGE | ASSUMED NUMBER OF FULL BACKUPS | 20 PIECES |
| | | | ASSUMED MAXIMUM DIFFERENTIAL DATA ACCUMULATION AMOUNT | 1.2GB |
| | STORAGE DEVICE C | STORAGE | ASSUMED NUMBER OF FULL BACKUPS | 24 PIECES |
| | | | ASSUMED MAXIMUM DIFFERENTIAL DATA ACCUMULATION AMOUNT | 1.0GB |
| | CLOUD AREA D | CLOUD | ASSUMED NUMBER OF FULL BACKUPS | 6 PIECES |
| | | | ASSUMED MAXIMUM DIFFERENTIAL DATA ACCUMULATION AMOUNT | 4.8GB |
| ⋮ | ⋮ | ⋮ | ⋮ | ⋮ |

FIG.12

MIGRATION DESTINATION ASSUMED BACKUP SCHEDULE TABLE    205

| TASK ID (205a) | BACKUP TARGET ID (205b) | MIGRATION DESTINATION CANDIDATE ID (205c) | BACKUP TYPE (205d) | TASK EXECUTION TIME (205e) |
|---|---|---|---|---|
| ⋮ | ⋮ | ⋮ | ⋮ | ⋮ |
| TASK 1 | VM2 | STORAGE DEVICE B | FULL BACKUP | 2022/1/1 12:00 |
| TASK 2 | VM2 | STORAGE DEVICE B | DIFFERENTIAL BACKUP | 2022/1/1 12:48 |
| TASK 3 | VM2 | STORAGE DEVICE B | DIFFERENTIAL BACKUP | 2022/1/1 13:36 |
| TASK 4 | VM2 | STORAGE DEVICE B | DIFFERENTIAL BACKUP | 2022/1/1 14:24 |
| TASK 5 | VM2 | STORAGE DEVICE B | DIFFERENTIAL BACKUP | 2022/1/1 15:12 |
| TASK 6 | VM2 | STORAGE DEVICE B | DIFFERENTIAL BACKUP | 2022/1/1 16:00 |
| TASK 7 | VM2 | STORAGE DEVICE B | FULL BACKUP | 2022/1/1 16:48 |
| TASK 8 | VM2 | STORAGE DEVICE B | DIFFERENTIAL BACKUP | 2022/1/1 17:36 |
| TASK 9 | VM2 | STORAGE DEVICE B | DIFFERENTIAL BACKUP | 2022/1/1 18:24 |
| TASK 10 | VM2 | STORAGE DEVICE B | DIFFERENTIAL BACKUP | 2022/1/1 19:12 |
| ⋮ | ⋮ | ⋮ | ⋮ | ⋮ |
| TASK 101 | VM2 | STORAGE DEVICE C | FULL BACKUP | 2022/1/1 12:00 |
| TASK 102 | VM2 | STORAGE DEVICE C | DIFFERENTIAL BACKUP | 2022/1/1 12:48 |
| TASK 103 | VM2 | STORAGE DEVICE C | DIFFERENTIAL BACKUP | 2022/1/1 13:36 |
| TASK 104 | VM2 | STORAGE DEVICE C | DIFFERENTIAL BACKUP | 2022/1/1 14:24 |
| TASK 105 | VM2 | STORAGE DEVICE C | DIFFERENTIAL BACKUP | 2022/1/1 15:12 |
| TASK 106 | VM2 | STORAGE DEVICE C | FULL BACKUP | 2022/1/1 16:00 |
| TASK 107 | VM2 | STORAGE DEVICE C | DIFFERENTIAL BACKUP | 2022/1/1 16:48 |
| TASK 108 | VM2 | STORAGE DEVICE C | DIFFERENTIAL BACKUP | 2022/1/1 17:36 |
| TASK 109 | VM2 | STORAGE DEVICE C | DIFFERENTIAL BACKUP | 2022/1/1 18:24 |
| TASK 110 | VM2 | STORAGE DEVICE C | DIFFERENTIAL BACKUP | 2022/1/1 19:12 |
| ⋮ | ⋮ | ⋮ | ⋮ | ⋮ |

FIG.13

PREDICTED RESOURCE CONSUMPTION TABLE  206

| 206a | 206b | 206c | 206d | 206e |
|---|---|---|---|---|
| BACKUP TARGET ID | BACKUP MIGRATION DESTINATION ID | BACKUP DESTINATION TYPE | PREDICTED CONSUMED RESOURCE KIND | PREDICTED CONSUMED RESOURCE VALUE |
| VM2 | STORAGE DEVICE B | STORAGE | PREDICTED CONSUMED CAPACITY RESOURCE | 263.04GB |
|  |  |  | PREDICTED MAXIMUM CONSUMED MEMORY | 2.2GB |
|  | STORAGE DEVICE C | STORAGE | PREDICTED CONSUMED CAPACITY RESOURCE | 295.04GB |
|  |  |  | PREDICTED MAXIMUM CONSUMED MEMORY | 3.0GB |
|  | CLOUD AREA D | CLOUD | PREDICTED CLOUD COST | 40160 YEN/MONTH |
|  | ⋮ | ⋮ | ⋮ | ⋮ |
| ⋮ | ⋮ | ⋮ | ⋮ | ⋮ |

FIG.14

SCORE TABLE 207

| BACKUP TARGET ID (207a) | BACKUP MIGRATION DESTINATION ID (207b) | BACKUP DESTINATION TYPE (207c) | SCORE NAME (207d) | SCORE VALUE (207e) |
|---|---|---|---|---|
| VM2 | STORAGE DEVICE B | STORAGE | CALCULATION RESOURCE SCORE | 93.8 |
| | | | CAPACITY RESOURCE SCORE | 1136.96 |
| | | | UNIQUE CORRECTION SCORE | 0 |
| | | | TOTAL SCORE | 1230.76 |
| | STORAGE DEVICE C | STORAGE | CALCULATION RESOURCE SCORE | 29.0 |
| | | | CAPACITY RESOURCE SCORE | 504.96 |
| | | | UNIQUE CORRECTION SCORE | -100.0 |
| | | | TOTAL SCORE | 433.96 |
| | CLOUD AREA D | CLOUD | CLOUD COST SCORE | 1398.4 |
| | | | UNIQUE CORRECTION SCORE | -200.0 |
| | | | TOTAL SCORE | 1198.4 |
| | ⋮ | ⋮ | ⋮ | ⋮ |
| ⋮ | ⋮ | ⋮ | ⋮ | ⋮ |

BACKUP MANAGEMENT DEVICE AND BACKUP DESTINATION MIGRATION METHOD

BACKGROUND OF THE INVENTION

1. Field of the Invention

The present invention relates to a backup management device and a backup destination migration method, and particularly to a backup management device and a backup destination migration method that are suitable for, when data of a virtual machine is backed up in a system with a plurality of backup destinations, effectively utilizing the capacity of a device at a backup destination and optimizing the backup processing.

2. Description of the Related Art

With the advancement and spread of cloud computing, a number of IT systems are built in virtual machine environments and container environments, and it is becoming common for administrators to configure and operate each environment on such virtual machine environments and container environments according to system requirements. In addition, in recent years, it is important to appropriately manage backups of each environment according to operation requirements such that systems can continuously be operated even when failures occur due to sophisticated and diversified cyber attacks or human errors during the operation of large-sized complicated systems.

However, a high operation cost is required for administrators to consider the requirements of each of virtual machine environments and container environments and to appropriately set a schedule for acquiring backups.

A technique for optimizing a backup schedule of a virtual machine (hereafter, also simply referred to as a "VM") is disclosed in, for example, International Publication No. 2015/181937. In a schedule creation method for a VM described in International Publication No. 2015/181937, when backup data is stored in a storage device, the schedule for executing the backup is automatically adjusted on the basis of requirements in the operation of the VM such as a recovery point objective (RPO) and a recovery time objective (RTO) of each environment, backup requirements to secure resources of the whole system, the operating period of time of each environment, and the status of the system such as the use rate of resource areas.

SUMMARY OF THE INVENTION

International Publication No. 2015/181937 of the above prior art discloses a technique for adjusting the schedule for executing the backup when a storage device for storing the backup data is identified.

However, in the case where there is a plurality of storage devices to store backup data and the storage devices to store the data are different for each VM, when backup processing is set, there is a possibility that the capacity of one storage device is scarce to back up even though the capacity of another storage device is enough. In the technique described in International Publication No. 2015/181937, when adjusting the backup schedule of one VM, it is based on the use rate of resources of a storage device where the backup of the VM is stored. At this time, in the case where the backup requirements are not satisfied due to an increase in the use rate of the resources after the adjustment, the adjustment of the backup schedule cannot be completed even if there are surplus resources in the other storage devices. In this case, system administrators have to adjust the configuration of the backup by changing the configuration by a method such as transferring the surplus resources of the other storage devices to the storage device of the VM, and thus, the labor and costs for planning a configuration change of the system and operating are required for the administrators.

In such a situation, similar problems may occur when backing up data in not only VMs but also real machines.

An object of the present invention is to provide a backup management device and a backup destination migration method that reduce, when data of a real machine or a virtual machine is backed up in a system with a plurality of backup destinations, the cost required to change the configuration of the system and the burden on administrators, effectively utilize the capacity of a device at a backup destination, and optimize the backup processing.

According to a preferred configuration of the present invention, provided is a backup management device that selects a backup destination when backing up data of a backup target including a virtual machine or a physical server to a backup destination including a storage device or a cloud area. The backup management device includes a backup requirement table that holds backup requirement information, a backup specification table that holds information related to a capacity resource or calculation performance of the backup destination, an existing backup information table that holds a backup capacity collected from the backup destination, and a backup schedule table that holds information related to a task of backing up the data of the backup target to the backup destination. The backup requirement table, the backup specification table, and the backup schedule table are referred to, and when conditions related to the capacity resource specified in the backup requirement table cannot be satisfied when the data is backed up to the backup destination for the task of the backup target of the backup schedule table, predicted resource consumption when the data of the backup target in the task is backed up to each of other backup destinations is calculated by referring to the existing backup information table, a score representing a low impact on the resource when migrating to each of the other backup destinations is calculated on the basis of the predicted resource consumption, a backup destination as a migration destination of the backup related to the task is determined on the basis of the score, and the backup schedule table is updated such that the determined backup destination becomes the backup destination related to the task.

According to the present invention, it is possible to provide a backup management device and a backup destination migration method that reduce, when data of a real machine or a virtual machine is backed up in a system with a plurality of backup destinations, the cost required to change the configuration of the system and the burden on administrators, effectively utilize the capacity of a device at a backup destination, and optimize the backup processing.

BRIEF DESCRIPTION OF THE DRAWINGS

FIG. 7 is a diagram for showing an example of a backup destination specification table;

FIG. 8 is a diagram for showing an example of a backup requirement table;

FIG. 9 is a diagram for showing an example of an existing backup information table;

FIG. 10 is a diagram for showing an example of a backup schedule table;

FIG. 11 is a diagram for showing an example of a migration destination assumed backup information table;

FIG. 12 is a diagram for showing an example of a migration destination assumed backup schedule table;

FIG. 13 is a diagram for showing an example of a predicted resource consumption table;

FIG. 14 is a diagram for showing an example of a score table;

DESCRIPTION OF THE PREFERRED EMBODIMENT

Hereinafter, an embodiment according to the present invention will be described using FIG. 1 to FIG. 19.

First, a configuration of a backup management system according to an embodiment of the present invention will be described using FIG. 1 to FIG. 5.

Figure 1:
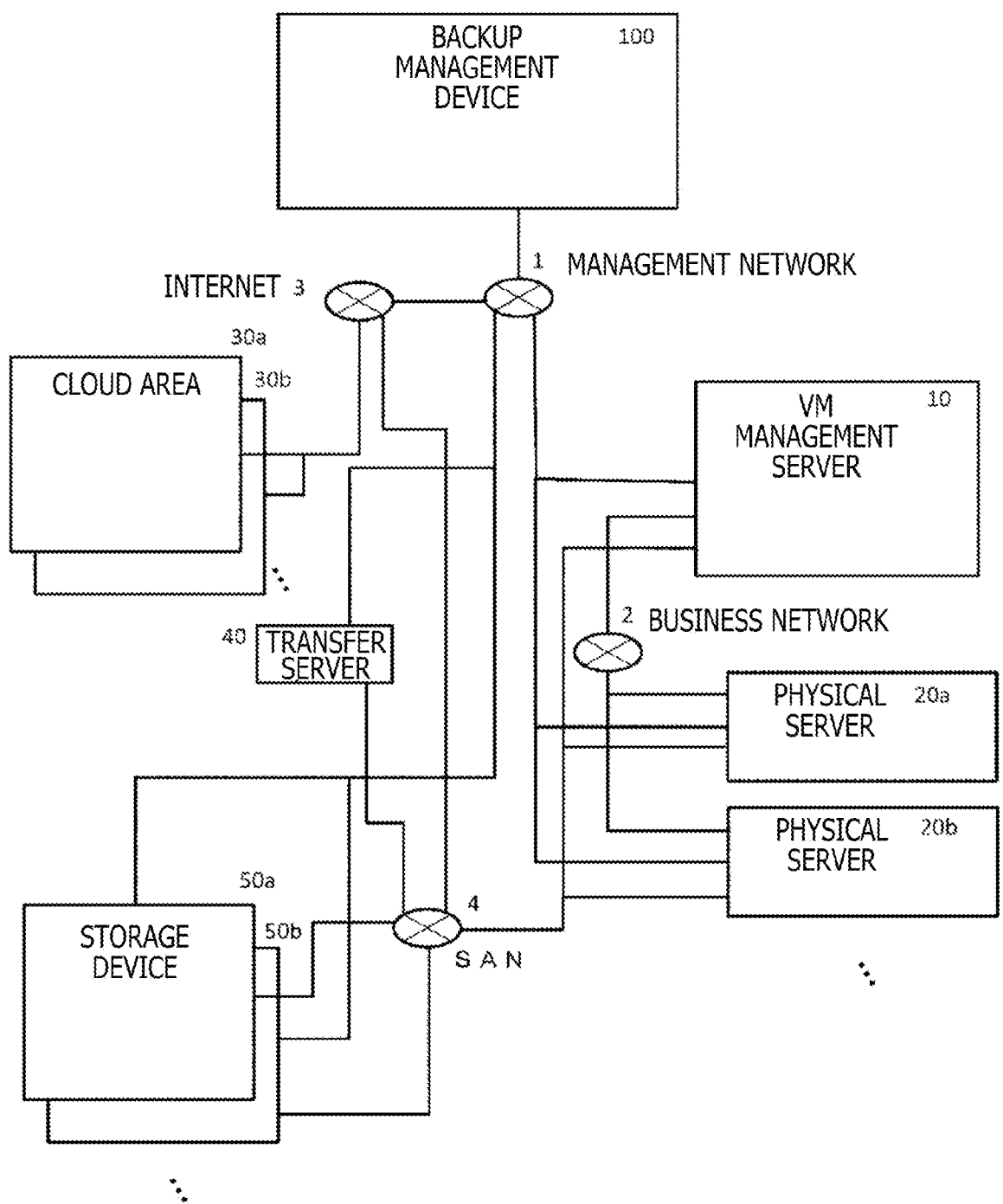
FIG. 1 is a configuration diagram for showing an example of a backup management system.

As shown in FIG. 1, the backup management system has a backup management device 100, a VM management server 10, physical servers 20 (denoted as 20a, 20b, and the like in FIG. 1), cloud areas 30 (denoted as 30a, 30b, and the like in FIG. 1), a transfer server 40, and storage devices 50 (denoted as 50a, 50b, and the like in FIG. 1), all of which are connected to each other through networks.

A management network 1 is connected to each of the VM management server 10, the physical servers 20, the transfer server 40, and the storage devices 50 and is connected to the Internet 3. The management network 1 is a network through which the backup management device communicates with each equipment when performing management such as backup execution of VMs executed on the VM management server 10 and servers executed in business such as the physical servers 20, and which administrators access for setting and maintaining the backup management device.

A business network 2 is connected to each of the VM management server 10 and the physical servers 20. The business network 2 is a network through which users access each server, communicate among the servers, and perform business in the VMs executed on the VM management server 10 and the servers executed in business such as the physical servers 20.

A storage area network (SAN) 4 is connected to each of the VM management server 10, the physical servers 20, and the transfer server 40 and is connected to the Internet 3. The SAN 4 is a network through which the VMs executed on the VM management server 10 and the servers executed in business such as the physical servers 20 input and output data to/from the storage devices 50.

The Internet 3 is a global network using the transmission control protocol/internet protocol (TCP/IP) and is connected to the cloud areas 30, the management network 1, and the SAN 4. In the present embodiment, the Internet 3 is the network through which the cloud areas 30 are accessed from the management network 1 and the SAN 4.

The backup management device 100 is a device that manages backup processing for data of the VMs executed on the VM management server 10 and the physical servers 20 to the storage devices 50. The backup management device 100 is connected to the management network 1, manages a backup schedule, and instructs the transfer server 40 to execute backups according to the backup schedule. In addition, the backup management device 100 also has a function of accepting backup requirements (requirements related to a system infrastructure and backup requirements related to business) and adjusting the backup schedule according to the requirements. Further, the backup management device 100 checks requirements related to the capacity resources of the storage devices or the cloud areas as backup destinations, switches backup destinations, and reconfigures the backup schedule when necessary (the details will be described later).

The VM management server 10 is a server that is connected to the management network 1, the business network 2, and the SAN 4, and manages and executes one or more VMs.

The physical servers 20 are server devices that are connected to the management network 1, the business network 2, and the SAN 4 and realized by physical hardware.

The cloud areas 30 are areas connected to the Internet 3 to manage backup data of the VMs provided by cloud services and executed on the VM management server 10 and the servers executed in business such as the physical servers 20, and are areas to store backup data in a capacity resource provided according to the charging cost.

The transfer server 40 is a server that is connected to the management network 1 and the SAN 4 and accepts an instruction from the backup management device 100 to transfer the data of the VMs executed on the VM management server 10 and the physical servers 20 as backup data to the storage devices 50 as backup destinations.

Figure 2:
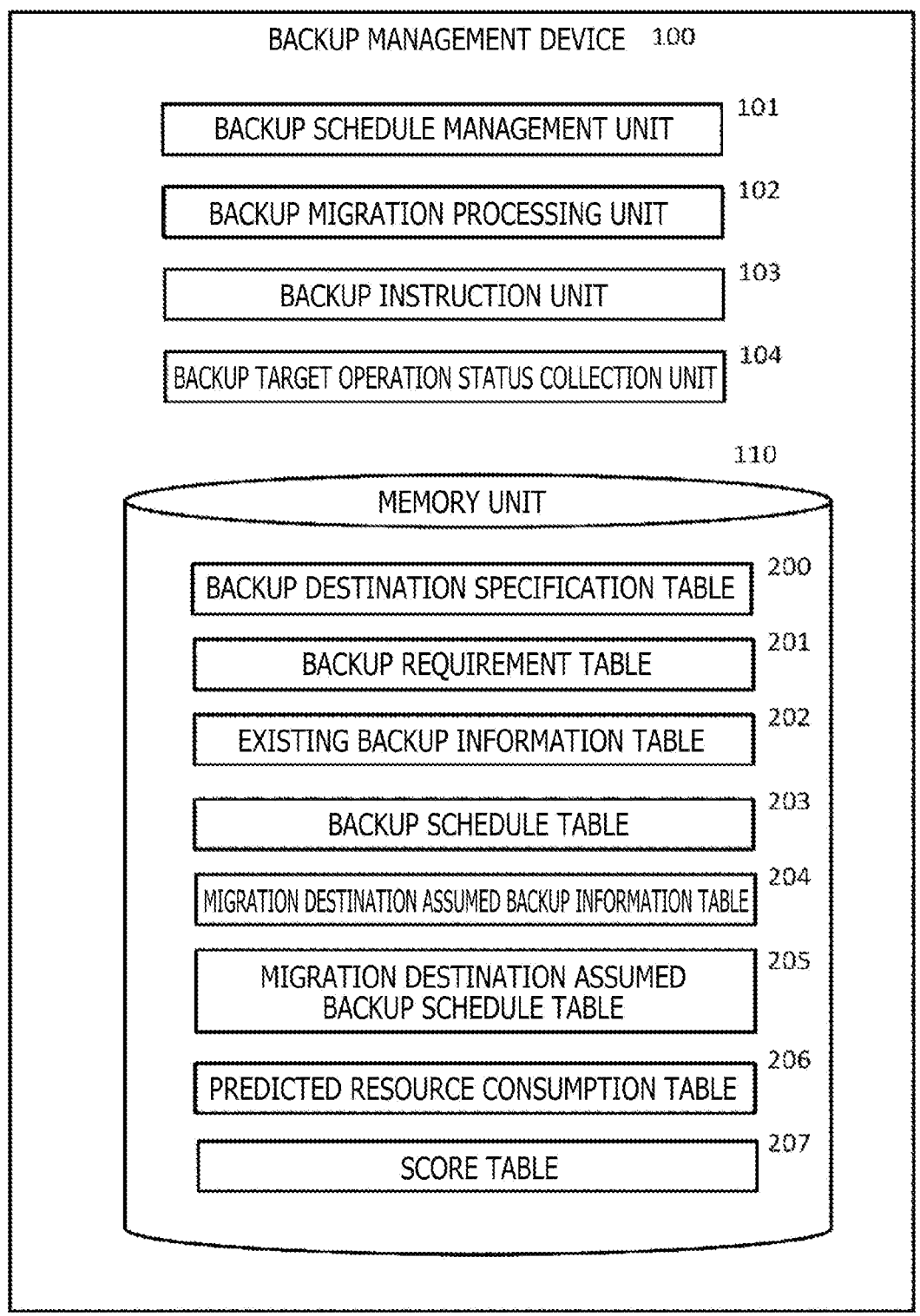
FIG. 2 is a functional configuration diagram of a backup management device.

As shown in FIG. 2, the backup management device 100 has, as functional configurations, a backup schedule management unit 101, a backup migration processing unit 102, a backup instruction unit 103, a backup target operation status collection unit 104, and a memory unit 110.

The backup schedule management unit 101 is a functional unit that manages the backup schedule of backup execution and adjusts the backup schedule to the optimum one according to the system requirements required for backup, the capacity of the backup destination, and the charging cost. The backup migration processing unit 102 is a functional unit that selects a storage device 50 or a cloud area 30 as a backup destination on the basis of the specifications of the backup destinations and the system resources required for backup and performs migration of backup. The backup instruction unit 103 is a functional unit that instructs the transfer server 40 to back up the data of the VMs executed on the VM management server 10 and the physical servers 20, on the basis of the backup schedule. The backup target operation status collection unit 104 is a functional unit that collects the operation status related to the backup of the VMs or the physical servers to be backed up.

The memory unit 110 is a memory unit that holds tables and data used in the backup management device 100.

The memory unit 110 holds a backup destination specification table 200, a backup requirement table 201, an existing backup information table 202, a backup schedule table 203, a migration destination assumed backup information table 204, a migration destination assumed backup schedule table 205, a predicted resource consumption table 206, and a score table 207. It should be noted that the details of each table will be described later.

Figure 3:
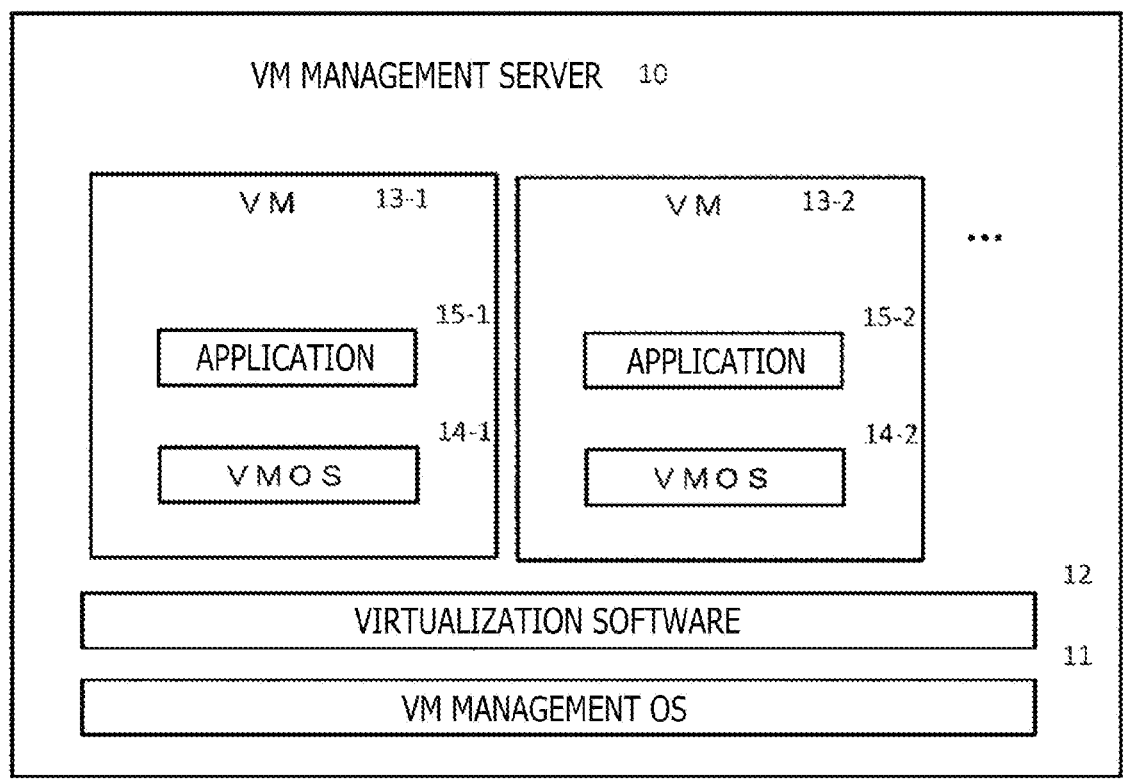
FIG. 3 is a functional configuration diagram of a VM management server.

The VM management server 10 is a server device that allows the VMs to execute, and includes, as functional configurations, a VM management operating system (OS) 11, virtualization software 12, and VMi:13-$i$ ($i$=1, 2, and the like) as shown in FIG. 3.

The VM management OS 11 is an operating system that manages the VMs. The virtualization software 12 is software that allocates hardware resources on the VMs and realizes the VMs on the VM management OS 11.

The VMi:13-$i$ are VMs realized on the VM management server. The VMi:13-$i$ are realized on the VM management OS 11 as virtual computers, and execute application software 15-$i$ ($i$=1, 2, and the like) on VM operating systems (OSs) 14-$i$ ($i$=1, 2, and the like).

As the forms of realizing the VMs, there are a host type and a hyper type in general, and the VM management server 10 is described in the realization form of the host type in FIG. 3, but the backup destination migration method of the present embodiment may be of the hyper type. It should be noted that the VM management OS 11 is often referred to as a host OS and the VMOS 14-$i$ are referred to as guest OSs in the host-type VM. In the hyper-type VM, the VM management OS 11 is integrated with a virtualization function, and the hyper-type VM becomes a model for executing the VMOS 14-$i$ (guest OSs) on a hypervisor.

Figure 4:
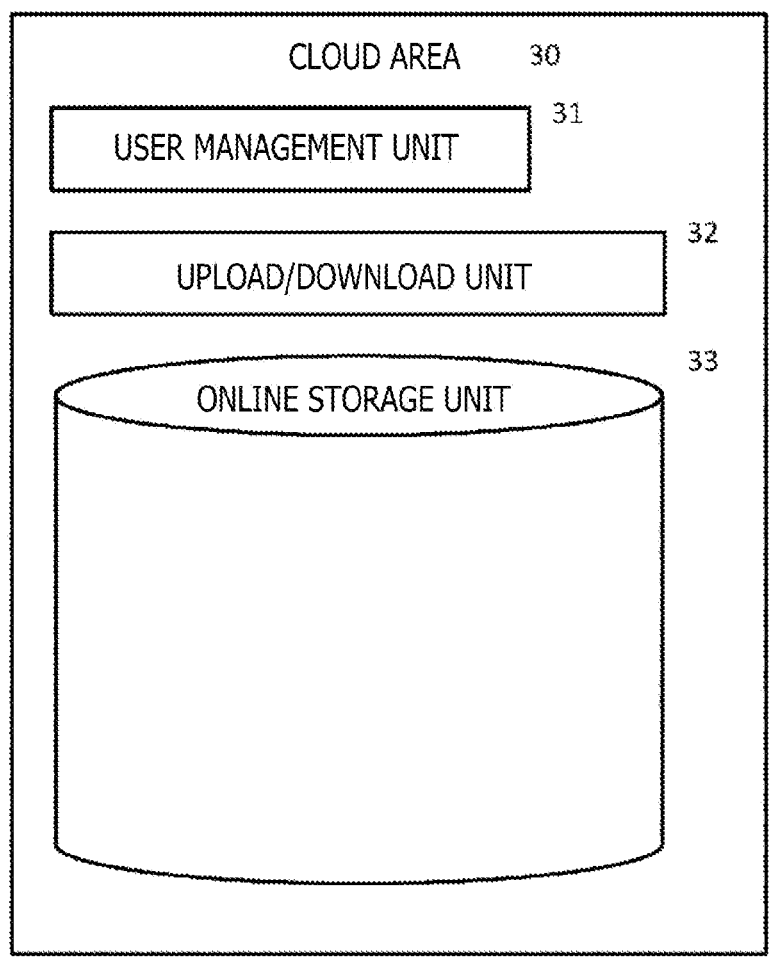
FIG. 4 is a functional configuration diagram of a cloud area.

As shown in FIG. 4, the cloud area 30 includes a user management unit 31, an upload/download unit 32, and an online storage unit 33. The cloud area 30 of the present embodiment provides a data storage function through cloud services, that is, what is generally called online storage services. The cloud area 30 is realized as a file server connected to the Internet 3. It should be noted that, in the following description, it is assumed that sufficient storage capacity can be provided as the cloud area 30 as long as charges for users are allowed.

The user management unit 31 is a functional unit that manages users who use services and charges for users. The upload/download unit 32 is a functional unit that receives the upload/download of data from a client who receives the provision of cloud services. The online storage unit 33 is a functional unit that realizes the storage function of the cloud services.

Figure 5:
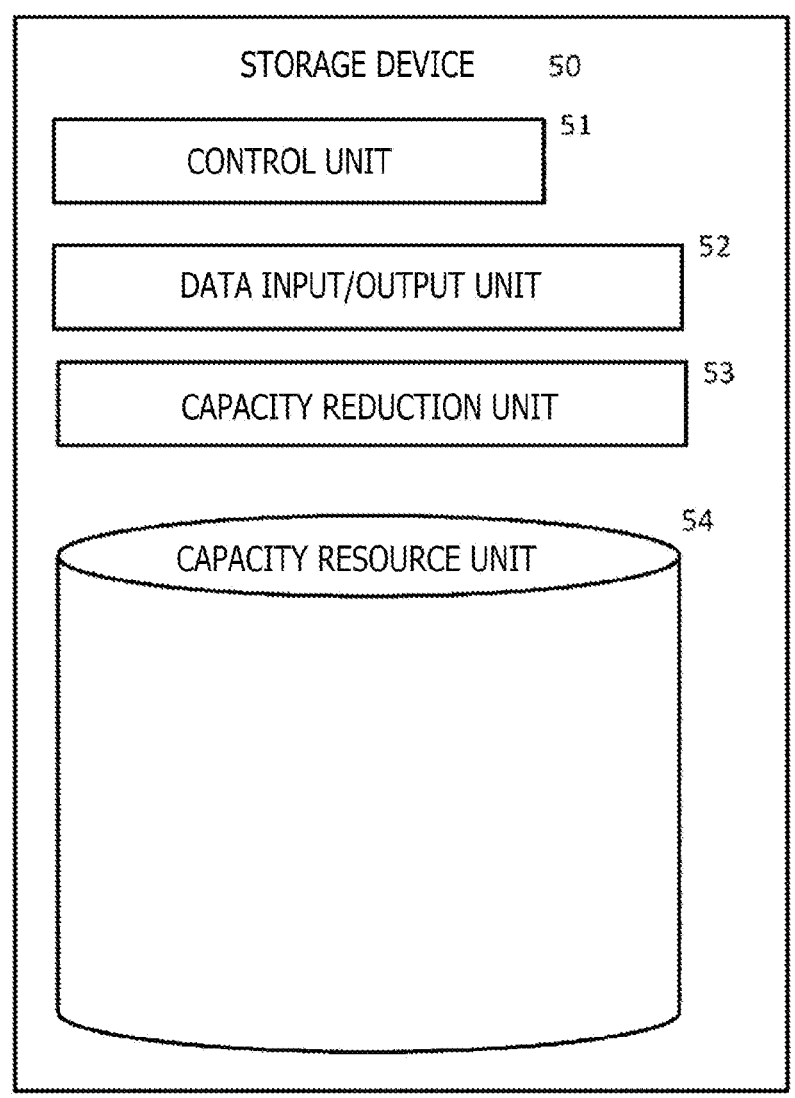
FIG. 5 is a functional configuration diagram of a storage device.

As shown in FIG. 5, the storage device 50 includes a control unit 51, a data input/output unit 52, a capacity reduction unit 53, and a capacity resource unit 54.

The control unit 51 is a functional unit that controls the storage device 50 and instructs the data input/output unit 52 to input and output (read/write) data of a storage medium. The capacity reduction unit 53 is a functional unit that realizes a capacity reduction function. The capacity reduction function is a function that analyzes duplicate data and memorizes data obtained by eliminating the duplication in the case where a plurality of backups is performed.

The capacity resource unit 54 is a functional unit that stores a large amount of data, and is realized by, in terms of hardware, a magnetic memory device such as a hard disk drive (HDD) or a non-volatile semiconductor memory device such as a solid state drive (SSD). The capacity resource unit 54 of the large-scale storage device 50 configures a disk array and has a redundant memory function such as redundant array of inexpensive disks (RAID).

Next, a hardware/software configuration of the backup management device will be described using FIG. 6.

Figure 6:
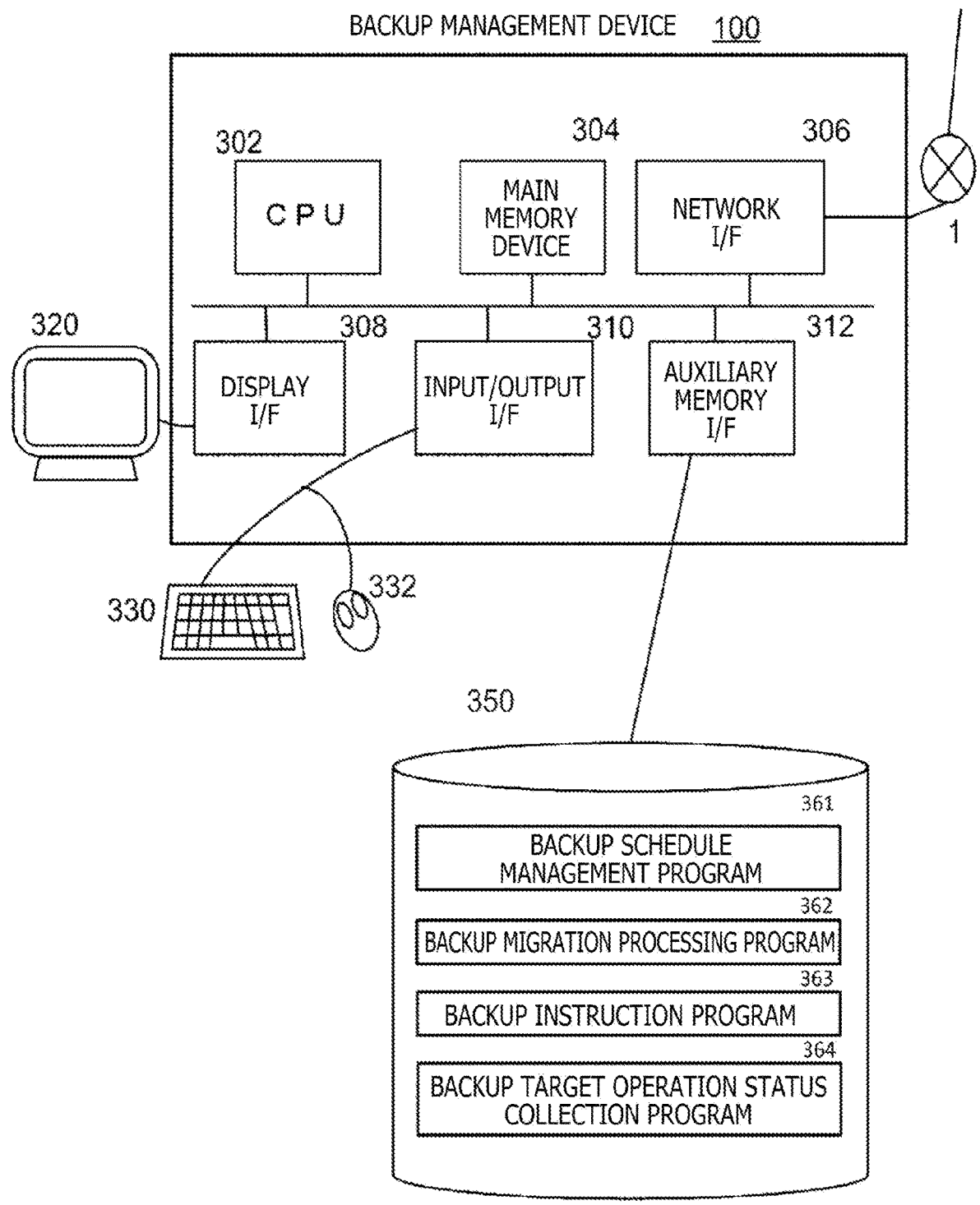
FIG. 6 is a hardware/software configuration diagram of the backup management device.

The hardware configuration of the backup management device 100 is realized by, for example, a general information processing device such as a workstation shown in FIG. 6.

The backup management device 100 has a configuration in which a central processing unit (CPU) 302, a main memory device 304, a network interface (I/F) 306, a display I/F 308, an input/output I/F 310, and an auxiliary memory I/F 312 are connected to one another via a bus.

The CPU 302 controls each unit of the backup management device 100 and loads and executes programs necessary for the main memory device 304.

The main memory device 304 is generally configured using a volatile memory such as a random access memory (RAM) and memorizes programs executed by the CPU 302 and data to be referred to.

The network I/F 306 is an interface for connecting to the management network 1.

The display I/F 308 is an interface for connecting a display device 320 such as a liquid crystal display (LCD).

The input/output I/F 310 is an interface for connecting input/output devices. In the example of FIG. 6, a keyboard 330 and a mouse 332 of a pointing device are connected.

The auxiliary memory I/F 312 is an interface for connecting an auxiliary memory device such as an HDD 350 or an SSD.

The HDD 350 has a large memory capacity and stores programs for executing the present embodiment. In the backup management device 100, a backup schedule management program 361, a backup migration processing program 362, a backup instruction program 363, and a backup target operation status collection program 364 are installed.

The backup schedule management program 361, the backup migration processing program 362, the backup instruction program 363, and the backup target operation status collection program 364 are programs that realize the functions of the backup schedule management unit 101, the backup migration processing unit 102, the backup instruction unit 103, and the backup target operation status collection unit 104, respectively.

In addition, although not illustrated in FIG. 6, the HDD 350 stores the backup destination specification table 200, the backup requirement table 201, the existing backup information table 202, the backup schedule table 203, the migration destination assumed backup information table 204, the migration destination assumed backup schedule table 205, the predicted resource consumption table 206, and the score table 207.

Next, the data structure used in the backup management device will be described using FIG. 7 to FIG. 14.

The backup destination specification table 200 is a table for storing the specifications of the storage devices or the cloud areas as the backup destinations and includes fields of a backup destination ID 200a, a backup destination type 200b, an attribute name 200c, and an attribute value 200d as shown in FIG. 7.

The backup destination ID 200a stores an ID that uniquely represents the storage device or the cloud area as the backup destination. The backup destination type 200b stores a flag that indicates whether the backup destination is the storage device or the cloud area. The attribute name 200c stores an ID or a name that indicates the attribute of the storage device or the cloud area as the backup destination. The attribute value 200d stores the value of the attribute stored in the attribute name 200c of the storage device or the cloud area corresponding to the backup destination ID 200a.

For example, "0.1 GB can be restored per minute" is described for the attribute name 200c "restore performance" in the storage device of the backup destination ID 200a "storage device A," and "1000 GB" is described for the attribute name 200c "maximum capacity resource."

In addition, for example, "1.0 GB can be restored per minute" is described for the attribute name 200c "restore performance" in the cloud area of the backup destination ID 200a "cloud area D," and "250000 yen per month" is described for the attribute name 200c "upper-limit cloud cost."

The backup requirement table 201 is a table for storing information required for the backup in the backup management system and includes fields of a backup requirement kind 201a, a backup requirement item 201b, a backup requirement content 201c, and a target system resource ID 201d as shown in FIG. 8.

The backup requirement kind 201a stores the kind of requirement required for the backup. The record of the backup requirement kind 201a "IT infrastructure requirement" stores the requirements for hardware resources and software resources of the system required for the backup management system, and the record of the backup requirement kind 201a "user requirement" stores the requirements required by the user for the backup processing. The backup requirement item 201b stores an ID or a name that uniquely represents the item of the backup requirement. The backup requirement content 201c stores the content of the backup requirement related to the backup requirement item 201b. The target system resource ID 201d stores the ID of the system resource (the storage device, the cloud area, the physical server, or the VM) related to the backup requirement.

The existing backup information table 202 is a table for storing information related to backups before migration to the backup destination and includes fields of a system resource ID 202a, a backup capacity kind 202b, and a backup capacity value 202c as shown in FIG. 9.

The system resource ID 202a stores the ID of the VM or the physical server related to the backup. In the backup capacity kind 202b, a name or an ID that represents the kind of capacity related to the backup is stored as "current total full backup capacity," "current total differential backup capacity," or "average full backup capacity." The backup capacity value 202c stores the backup capacity value of the backup capacity kind indicated in the backup capacity kind 202b of the VM or the physical server with the value of the system resource ID 202a.

The backup schedule table 203 is a table for storing information related to the current backup schedule and includes fields of a task ID 203a, a backup target ID 203b, a backup destination ID 203c, a backup type 203d, and a task execution time 203e as shown in FIG. 10.

The task ID 203a stores an ID that uniquely represents the task of the backup schedule. Here, the "task" refers to a single backup execution process scheduled in the backup schedule. The backup target ID 203b stores an ID that uniquely represents the VM or the physical server to be backed up. The backup destination ID 203c stores an ID that uniquely represents the storage device or the cloud area as the backup destination. The backup type 203d stores backup modes such as "full backup," "differential backup," and "incremental backup" as the backup types. The task execution time 203e stores the date and time of execution of the backup in the format of "yyyy/mm/dd hhmm."

The migration destination assumed backup information table 204 is a table for storing information related to backups assumed after migration to the backup destination when selecting a candidate to be the migration destination and performing the backup, and has fields of a backup target ID 204a, a backup migration destination candidate ID 204b, a backup destination type 204c, an assumed backup content kind 204d, and an assumed backup content value 204e as shown in FIG. 11.

The backup target ID 204a stores an ID that uniquely represents the VM or the physical server to be backed up. The backup migration destination candidate ID 204b stores an ID that uniquely represents the storage device or the cloud area that becomes a candidate of the migration destination of the backup (the details will be described later). The assumed backup content kind 204d stores an ID or a name that represents "the assumed number of full backups" and "assumed maximum differential data accumulation amount" as the kinds of assumed backup content. The assumed backup content value 204e stores the assumed number of full backups or the assumed maximum differential data accumulation amount according to the value of the assumed backup content kind 204d.

The migration destination assumed backup schedule table 205 is a table for storing information related to the backup schedule when selecting a candidate to be the migration destination and performing the backup, and each field is, as shown in FIG. 12, similar to the backup schedule table 203 shown in FIG. 10.

The predicted resource consumption table 206 is a table for storing the resource consumption required for the predicted backup when the backup destination is migrated, and has fields of a backup target ID 206a, a backup migration destination ID 206b, a backup destination type 206c, a predicted consumed resource kind 206d, and a predicted consumed resource value 206e as shown in FIG. 13.

The backup target ID 206a stores an ID that uniquely represents the VM or the physical server to be backed up. The backup migration destination ID 206b stores an ID that uniquely represents the storage device or the cloud area as the backup destination. The backup destination type 206c stores a flag that indicates whether the backup destination is the storage device or the cloud area. The predicted consumed resource kind 206d stores the kind of resource predicted to be consumed when the backup destination is migrated to the storage device or the cloud area indicated in the backup migration destination ID 206b. When the backup destination type 206c is "storage device," the predicted consumed resource kind 206d has, for example, "predicted consumed capacity resource" and "predicted maximum consumed memory," and when the backup destination type 206c is "cloud area," the predicted consumed resource kind 206d is, for example, "predicted cloud cost." In the predicted consumed resource value 206e, the value of the predicted consumed resource indicated in the predicted consumed resource kind 206d is stored as a unit of capacity or charge per month.

The score table 207 is a table for holding a score (the details will be described later) used to select a backup migration destination, for each candidate of the backup migration destination, and has fields of a backup target ID 207a, a backup migration destination ID 207b, a backup destination type 207c, a score name 207d, and a score value 207e as shown in FIG. 14.

The backup target ID 207a stores an ID that uniquely represents the VM or the physical server to be backed up. The backup migration destination ID 207b stores an ID that uniquely represents the storage device or the cloud area as the backup destination. The backup destination type 207c stores a flag that indicates whether the backup destination is the storage device or the cloud area. The score name 207d is used to select a backup migration destination and stores the name of the score. When the backup destination type 207c is "storage device," the score name 207d has "calculation resource score," "capacity resource score," "unique correction score," and "total score," and when the backup destination type 207c is "cloud area," the score name 207d has "cloud cost score," "unique correction score," and "total score." The score value 207e stores the value of the score indicated in the score name 207d.

Next, an overview of backup destination migration processing performed by the backup management device will be described using FIG. 15.

First, during the normal operation of the business system, the backup target operation status collection unit 104 of the backup management device 100 collects the following information related to the existing backup of the VM or the physical server performing the business (S01), and stores the collected information in the existing backup information table 202 (S01→a).

(01) Current total full backup capacity: the total value [GB] of the capacities of all backups acquired in the full backup

(02) Current total differential backup capacity: the total value [GB] of the capacities of all backups acquired in the differential backup

(03) Average full backup capacity: the average [GB/piece] of the capacities of all backups acquired in the full backup It should be noted that, in general, a backup method in which all data to be backed up is copied and stored in the backup destination is referred to as a full backup, and a backup method in which only differential information from the previous full backup is stored is referred to as a differential backup. In order to recover to the state of the differential backup, it is necessary to perform processing of acquiring and restoring the differential information accumulated from the latest full backup.

Further, the following information of the backup destination is collected and stored in the backup destination specification table 200 (S01→b).

(11) Restoration performance: the data capacity that can be recovered per unit period of time when the differential backup is recovered from the storage device 50 or the cloud area 30 as the backup destination

(12) Information of the storage device 50

(121) Maximum capacity resource: the maximum value of the data capacity of the capacity resource of the device (122) Current consumed capacity resource: the value of the data capacity currently consumed by the capacity resource of the device.

(123) Capacity reduction performance: the value [%] representing the percentage of the capacity of the original data to which the actual consumed capacity is reduced (by the function of the device) in the case where the backup data is stored in the device (124) Basic consumed memory: the memory capacity [GB] that is always consumed when recovering a single differential backup (125) Capacity-dependent consumed memory: the memory capacity [GB/GB (accumulation amount)] consumed, when restoring a single differential backup, in proportion to the accumulation amount of differential information of the differential backup (126) Maximum memory: the maximum value [GB] of the memory capacity of the device (127) Current consumed memory: the value [GB] of the memory capacity currently consumed in the device

(13) Information of the cloud area 30

(131) Current consumed cloud cost: the cost [yen/month] per certain period of time currently charged for the use of the cloud area for the system (132) Capacity-dependent cloud cost: the cost [yen/month·GB] per certain period of time charged in proportion to the use capacity of the capacity resource consumed by the backup data capacity in the case where the backup data is managed in the cloud area (133) Upper-limit cloud cost: the upper-limit value [yen/month] of the cost per certain period of time allowed to be charged when using the cloud area for the system In addition, the backup administrator stores the following information in the backup destination specification table 200 according to the circumstances of the backup destination.

(14) Unique correction score: the score value that is related to the selection priority of the storage device 50 or the cloud area 30 as the backup destination and that directly represents, in the case where there are inherent characteristics that are not represented in the values of the specifications such as capacity and processing performance, an increase or decrease in the score due to the characteristics For example, since a failure alert is lit for many of hardware groups for storing data in one storage device and there is a risk that the function is degenerated due to a partial failure in the future, it is desirable to lower the priority of selecting the device as the migration destination. Therefore, the unique correction score of the device is designated as "−100."

Next, the backup management device 100 performs adjustment processing of the backup schedule, using an existing method (S00, for example, International Publication No. 2015/181937).

In the schedule adjustment processing, for each backup task in the backup schedule table 203, the backup requirements specified in the backup requirement table 201 are checked for the storage device 50 or the cloud area 30 as the backup destination, and in the case where the policy related to the capacity resource use rate cannot be satisfied (S00→c), the following processing is performed on the VM or the physical server (hereinafter, referred to as a "migration backup target") to be backed up.

The followings are sequentially executed for a backup destination (hereinafter, referred to as a "backup migration destination candidate") other than the storage device or the cloud area that is the current backup destination of the backup target.

The backup schedule adjustment processing is performed according to an existing method with the backup migration destination candidate as the backup destination to be adjusted and the migration backup target as the adjustment target. Accordingly, a backup schedule (hereinafter, referred to as a "migration destination assumed schedule") in the case where the backup of the migration backup target is executed is obtained by the backup migration destination candidate (S11).

At this time, the processing is performed on the assumption that the current total full backup capacity and the current total differential backup capacity of the migration backup target are consumed for the capacity resource of the backup migration destination candidate in addition to the current consumed capacity resource.

Next, the followings are calculated from the migration destination assumed schedule and the backup storage period and stored in the migration destination assumed backup information table 204 (S11→d).

(21) Assumed number of full backups: the number [piece] of full backups among the backups assumed to be acquired within the backup storage period counting from the oldest existing backup in the migration destination assumed schedule

(22) Assumed maximum differential data accumulation amount: the value [GB] of the differential data accumulation amount at the time when the capacity of the differential data accumulation from the latest full backup is the largest among the differential backups assumed to be acquired within the backup storage period counting from the oldest existing backup in the migration destination assumed schedule Next, the followings are calculated for the backup destination other than that of the migration backup target (S12) and added to the predicted resource consumption table 206 (S12→e).

(31) In the case of the storage device 50
  (311) Predicted consumed capacity resource: the capacity value [GB] of the capacity resource predicted to be consumed in the case where the backup of the backup target is executed in the storage device, on the basis of the information of the existing backup information table 202 and the migration destination assumed backup information table 204 and the capacity reduction performance of the storage device
  (312) Predicted maximum consumed memory: the value [GB] of the largest consumed memory predicted to be consumed in the case where the differential backup of the backup target is recovered in the storage device, on the basis of the assumed maximum differential data accumulation amount and the calculation performance values (the basic consumed memory and the capacity-dependent consumed memory) at the time of recovery of the differential backup of the storage device

(32) In the case of the cloud area 30
  (321) Predicted cloud cost: the cost [yen/month] predicted to be charged in the case where the backup of the backup target is executed in the cloud area, on the basis of the information of the existing backup information table 202 and the migration destination assumed backup information table 204 and the capacity-dependent cloud cost of the cloud area Next, on the basis of the predicted resource consumption and the resource consumption statuses (the maximum memory, the current consumed memory, the maximum capacity, the current consumed capacity, the upper-limit cloud cost, and the current consumed cloud cost) of the backup migration destination candidate, scores (a capacity resource score, a calculation resource score, and a cloud cost score) representing a low impact on the resource are calculated, and the total score of the backup migration destination candidate is calculated from the capacity resource score, the calculation resource score, the cloud cost score, and the unique correction score (S13). Then, the value of each score is stored in the score table 207 (S13→f).

On the basis of the scores stored in the score table 207, the storage destination with the highest total score is selected and determined as the backup migration destination of the backup target (S14), the existing backup of the backup target is executed for the backup migration destination (S15), the future backup destination of the backup target is switched to the selected backup destination, and the migration destination assumed schedule in this case is reflected in the schedule table (S14→g).

Figure 15:
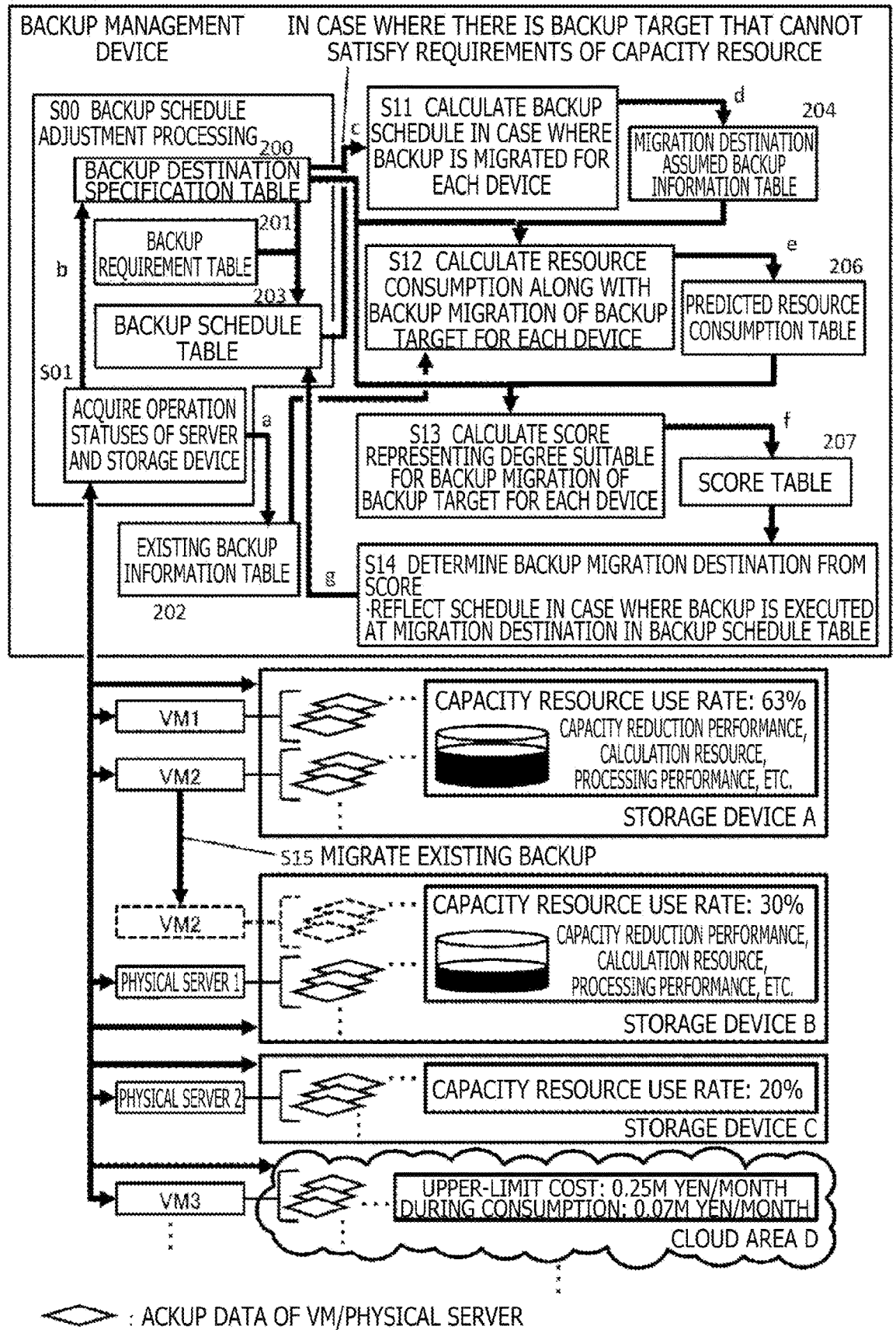
FIG. 15 is a diagram for describing an overview of backup destination migration processing performed by the backup management device.

FIG. 15 shows an example in which the backup target is a VM2 and the backup migration destination of the VM2 is set to a storage device B because the capacity resource use rate of an existing storage device A is insufficient.

Next, the detailed processing of the backup management device will be described using FIG. 16 to FIG. 18E.

First, the adjustment processing of the backup schedule of the backup management device will be described.

First, the adjustment processing of the backup schedule of the backup management device will be described using FIG. 16.

The backup management device 100 performs the processing of S101 to S106 for each of the VMs or the physical servers to be backed up (S100 to S107).

Next, the backup schedule management unit 101 of the backup management device 100 performs the adjustment processing of the backup schedule for the backup target (S101).

The details of the adjustment processing of the backup schedule for the backup target will be described later using FIG. 17.

Next, the backup management device 100 determines whether the adjustment processing of the backup schedule for the backup target has been completed with successful adjustment or completed with failed adjustment (S102), and the processing moves to S103 when it has been completed with successful adjustment (S102: successful adjustment), and the processing moves to S104 when it has been completed with failed adjustment (S102: failed adjustment).

When the adjustment processing of the backup schedule for the backup target has been completed with successful adjustment, the adjusted schedule is overwritten on the corresponding record in the backup schedule table 203 (S103), and the processing moves to S107.

When the adjustment processing of the backup schedule for the backup target has been completed with failed adjustment, the backup migration processing unit 102 of the backup management device 100 executes the backup migration processing for the corresponding backup target (S104).

It should be noted that the details of the backup migration processing will be described later using FIG. 18A to FIG. 18E.

Next, the backup management device 100 determines for the corresponding backup target whether the backup migration processing has been completed with successful migration or completed with failed migration (S105), and the processing moves to S107 when it has been completed with successful migration (S105: successful migration), and the processing moves to S106 when it has been completed with failed migration (S105: failed migration).

When the migration processing for the corresponding backup target has been completed with failed migration, the backup management device 100 displays the fact that the migration processing for the corresponding backup target has been completed with failed migration (S106).

In addition, it is necessary to contact the IT infrastructure administrator by means such as sending an e-mail or pop-up display on a management screen if the capacity resource of the storage device 50 or the cloud area 30 as the backup destination is manually adjusted.

Next, the adjustment processing of the backup schedule for the backup target will be described using FIG. 17.

Figure 16:
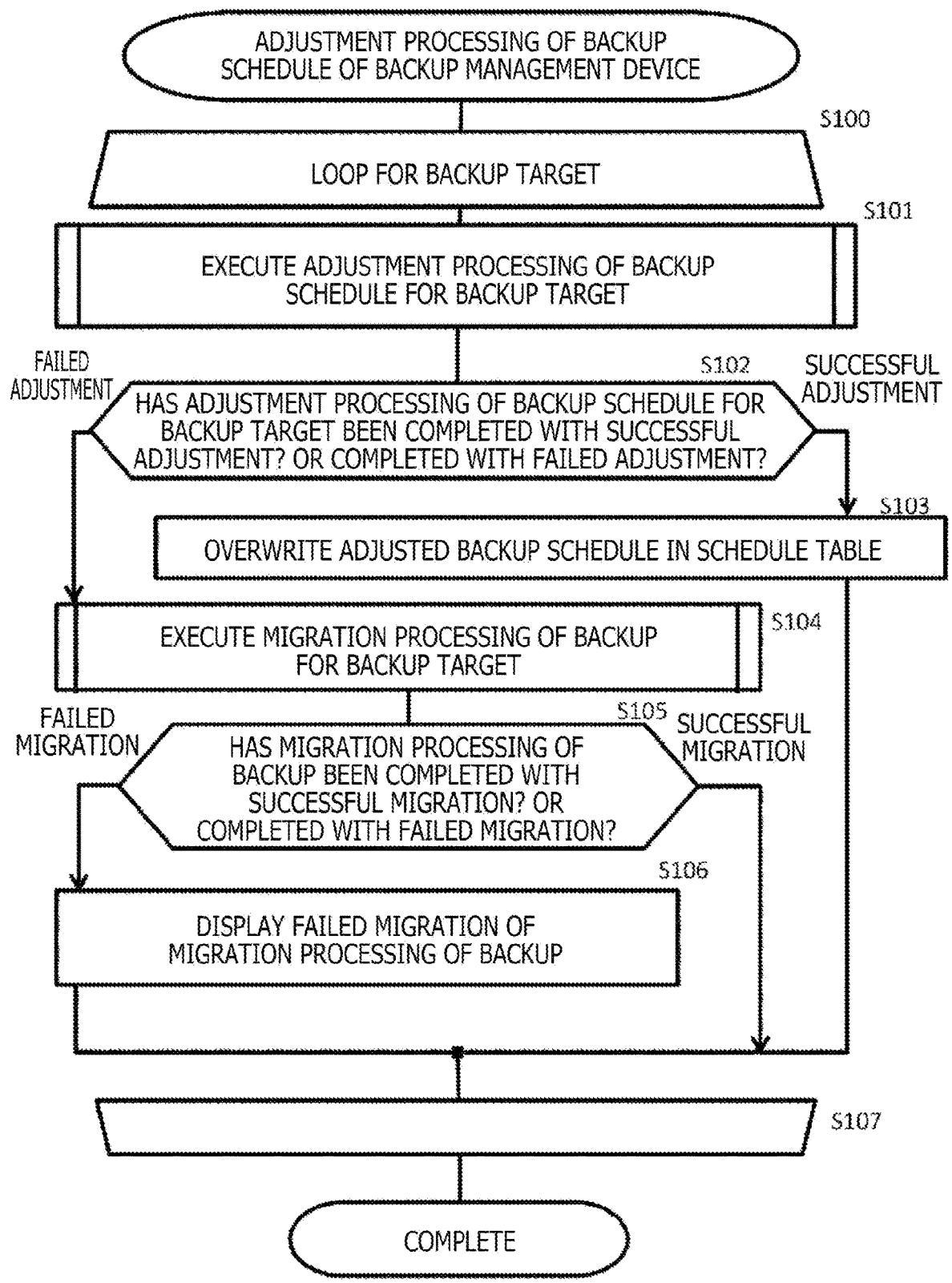
FIG. 16 is a flowchart for showing adjustment processing of a backup schedule of the backup management device.

This processing corresponds to S101 of FIG. 16.

First, the backup management device 100 refers to the backup schedule of the backup target from the backup schedule table 203, and in the case where a sufficient number of tasks are not scheduled after the existing tasks, differential backup tasks are added at regular intervals and at a sufficiently high frequency (S200).

Here, "a sufficient number of tasks" means that the tasks of the backup are described in the backup schedule table 203 to the extent that the backup requirements described in the backup requirement table are satisfied for the backup target.

Next, the backup management device 100 performs the processing of S202 to S204 for each task related to the backup target (S201 to S205).

Next, the backup management device 100 refers to the user requirements of the backup target and the IT infrastructure requirements of the backup destination from the backup requirement table 201, and refers to the items related to the determination of whether or not the requirements are satisfied, such as the restore performance and the current consumed capacity resource, from the backup destination specification table 200 (S202).

Next, in the case where the tasks do not satisfy the backup requirements specified in the backup requirement table, the backup management device 100 adjusts to satisfy the backup requirements by changing the execution time, reducing the tasks, changing the backup type, and the like (S203).

It should be noted that the tasks added in S200 that are useless and unnecessary are deleted in S203.

Next, the backup management device 100 determines whether or not the consumed capacity resources of the backup destination have been able to be reduced and the tasks have satisfied the requirement of the capacity resource use rate (S204), and when it is positive (S204: YES), the processing moves to S205, and when it is negative (that is, when the consumed capacity resources of the backup destination cannot be reduced any more and the tasks cannot satisfy the requirement of the capacity resource use rate) (S204: NO), the processing exits the loop of S201 to S205 and completes the adjustment processing of the backup schedule for the backup target as failed adjustment.

When S204 is positive, the processing moves to S205 to repeat the next loop.

Next, the backup migration processing will be described using FIG. 18A to FIG. 18E.

The backup management device 100 performs the processing of S301 to S318 for the backup migration destination candidate (a backup destination other than the storage device or the cloud area as the current backup destination of the backup target) (S300 to S319).

The backup management device 100 refers to the current total full backup capacity, the current total differential backup capacity, and the average full backup capacity related to the migration backup target from the existing backup information table 202 (S301).

Figure 17:
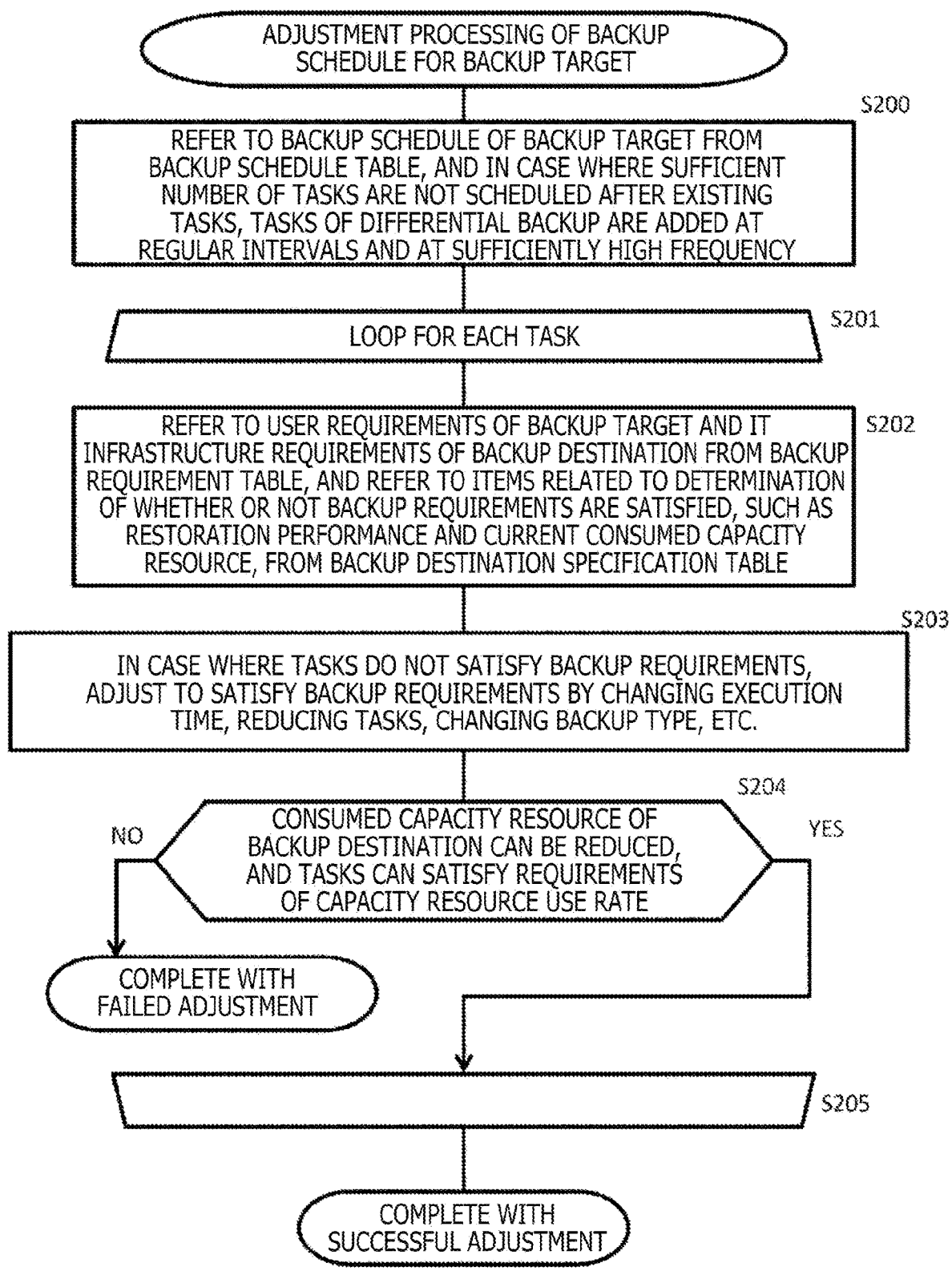
FIG. 17 is a flowchart for showing adjustment processing of the backup schedule for a backup target.

Next, the backup management device 100 executes the adjustment processing of the backup schedule for the backup target shown in FIG. 17 with the backup migration destination candidate as the backup destination to be adjusted and the migration backup target as the backup target to be adjusted, and calculates the migration destination assumed schedule (the schedule in the case where the backup of the migration backup target is performed by the migration destination candidate) (S302).

At this time, the processing is performed on the assumption that the current total full backup capacity and the current total differential backup capacity of the migration backup target are consumed for the capacity resource of the backup migration destination candidate in addition to the current consumed capacity resource.

Next, the backup management device 100 determines whether the adjustment processing of the backup schedule for the backup target called in S302 has been completed with successful adjustment or completed with failed adjustment (S303), and the processing moves to S305 when it has been completed with successful adjustment (S303: successful adjustment), and the processing moves to S304 when it has been completed with failed adjustment (S303: failed adjustment).

Figure 18A:
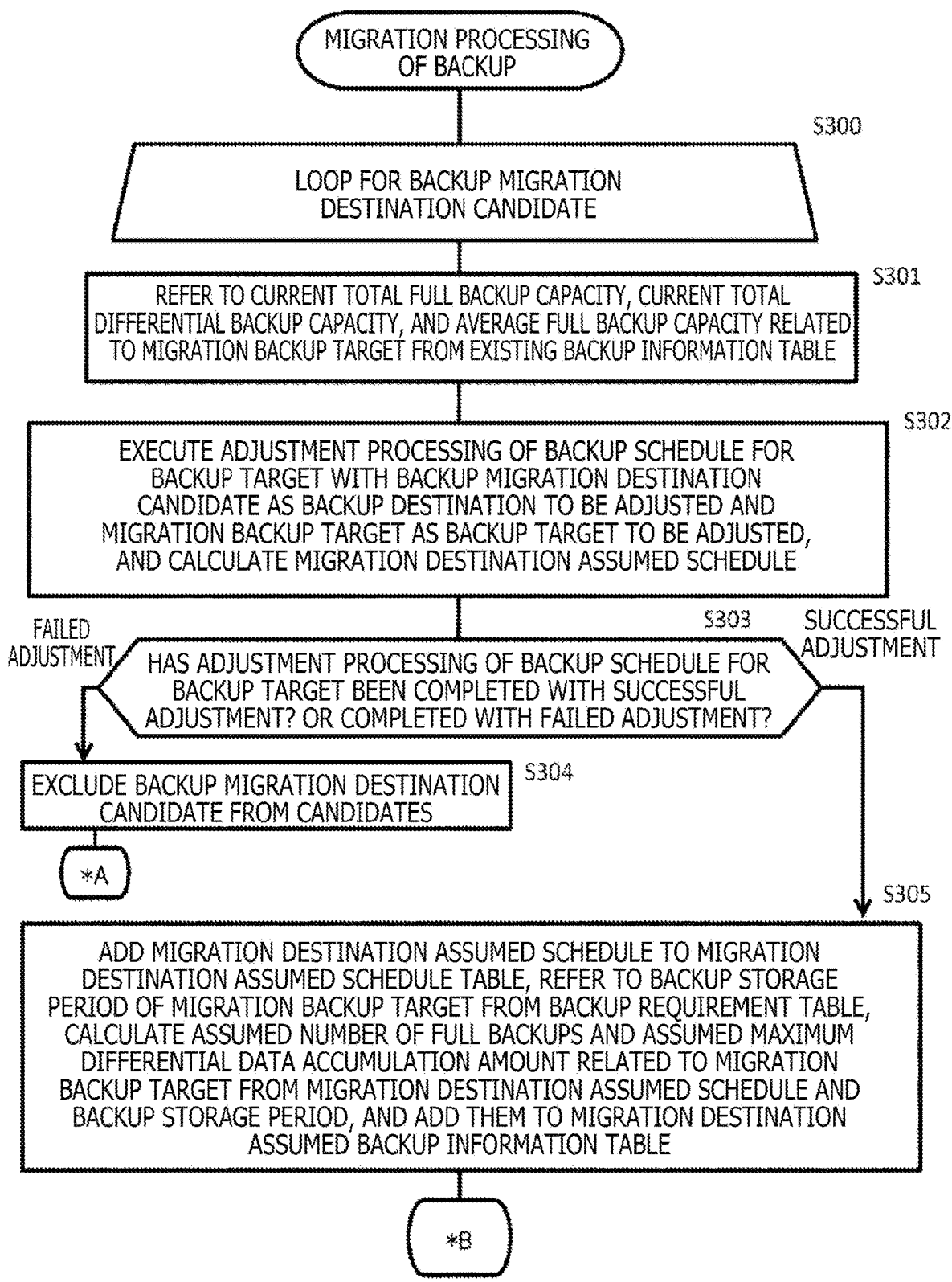
FIG. 18A is a flowchart for showing backup migration processing (part 1)
Figure 18B:
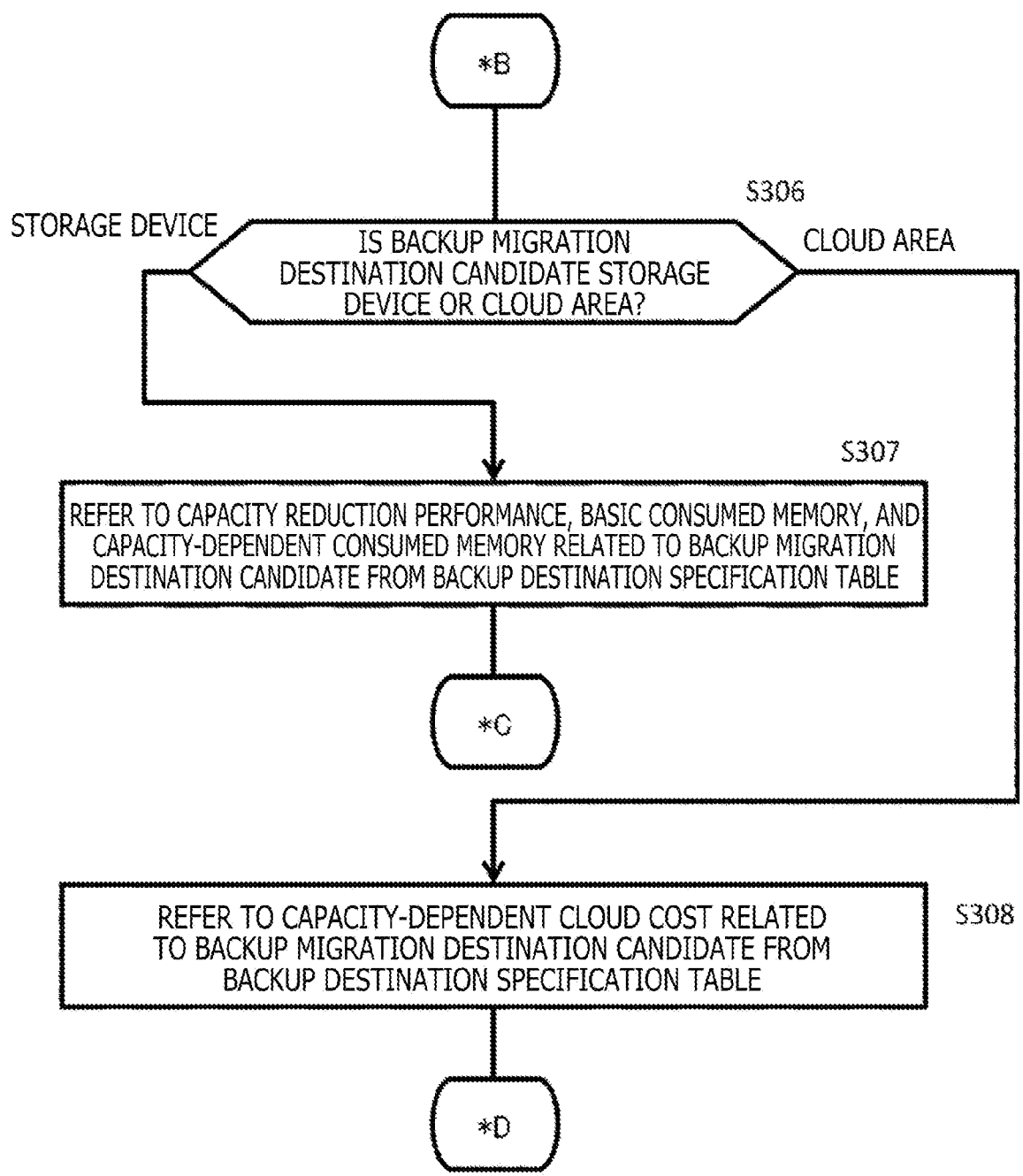
FIG. 18B is a flowchart for showing the backup migration processing (part 2)
Figure 18C:
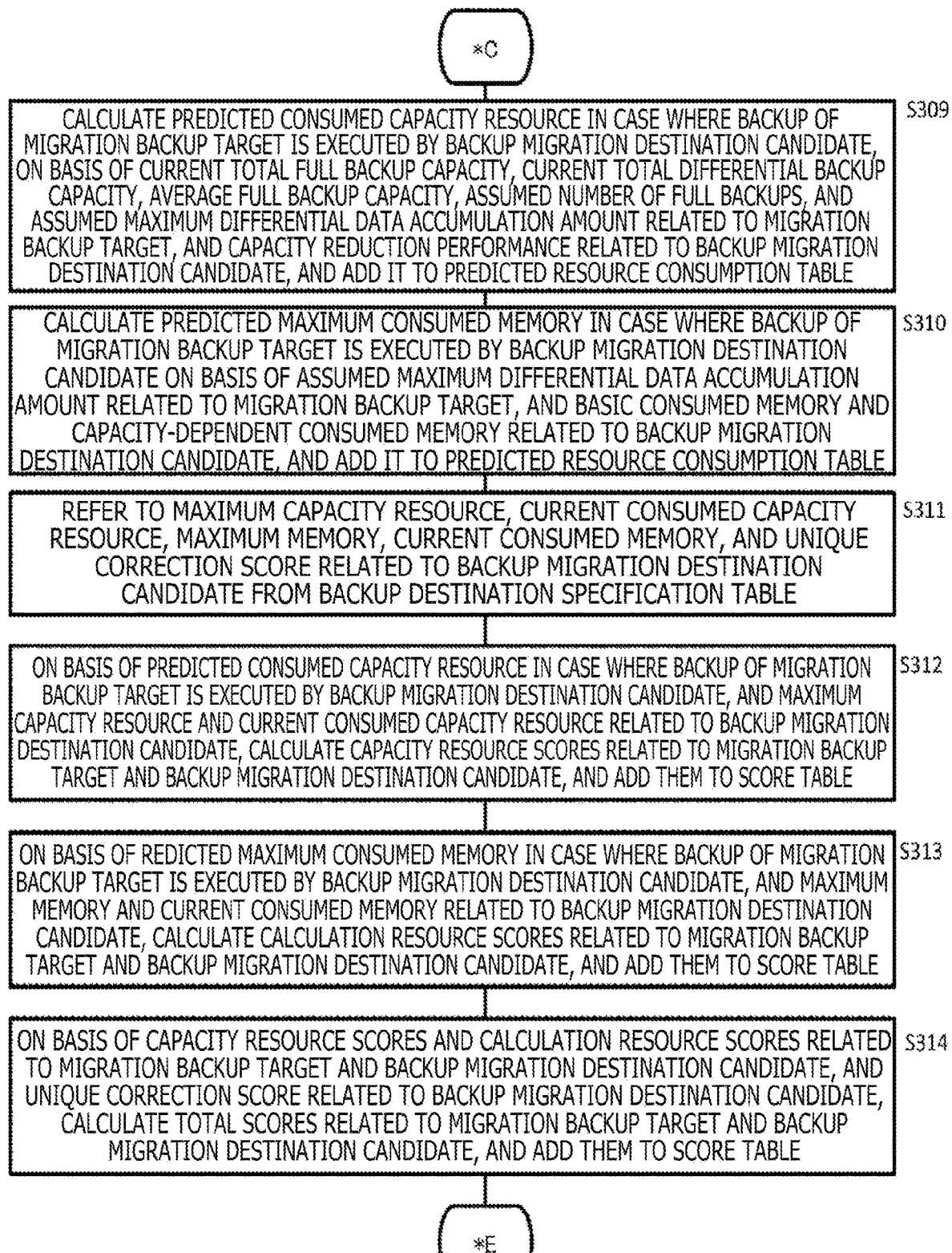
FIG. 18C is a flowchart for showing the backup migration processing (part 3)
Figure 18D:
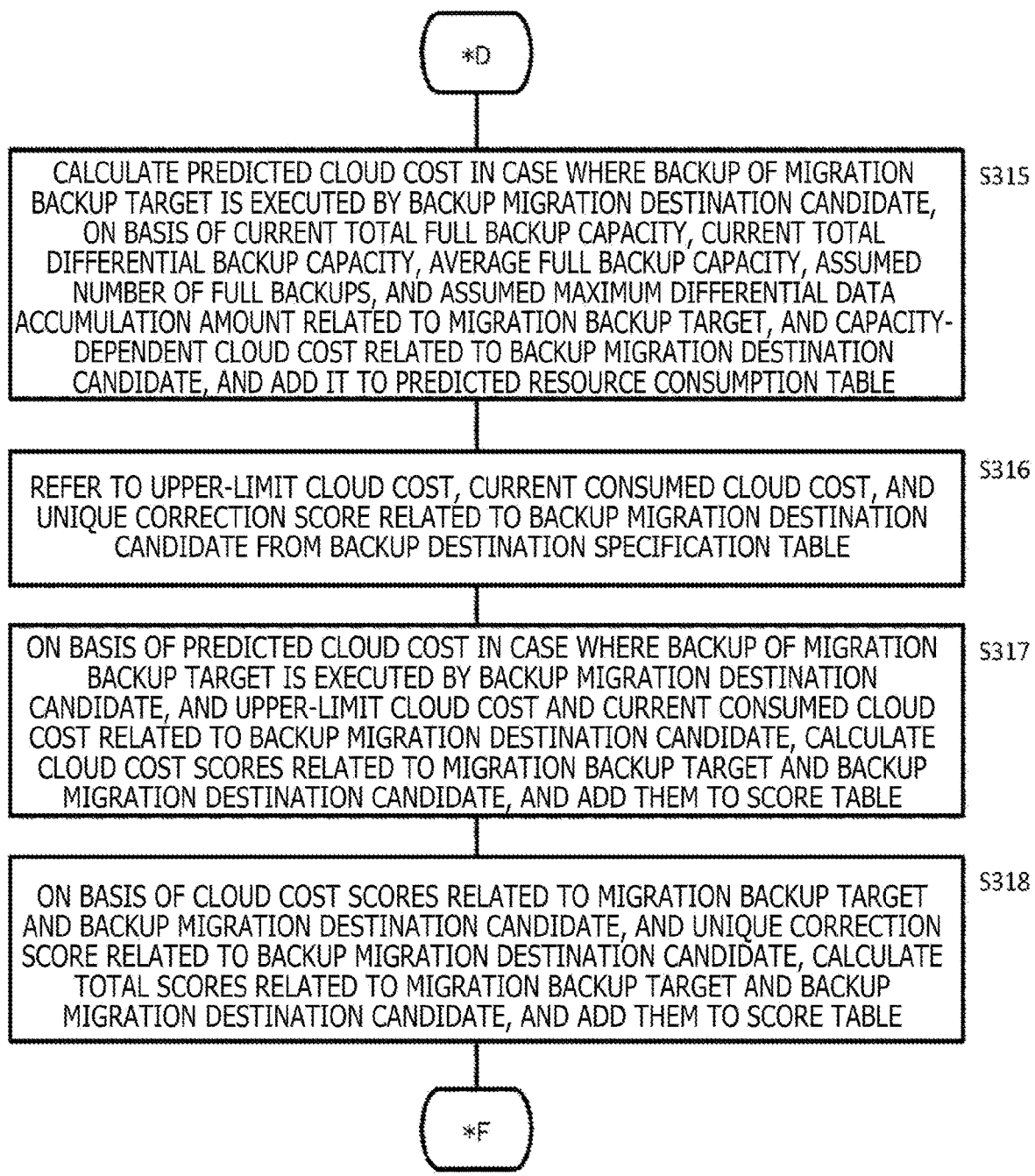
FIG. 18D is a flowchart for showing the backup migration processing (part 4)
Figure 18E:
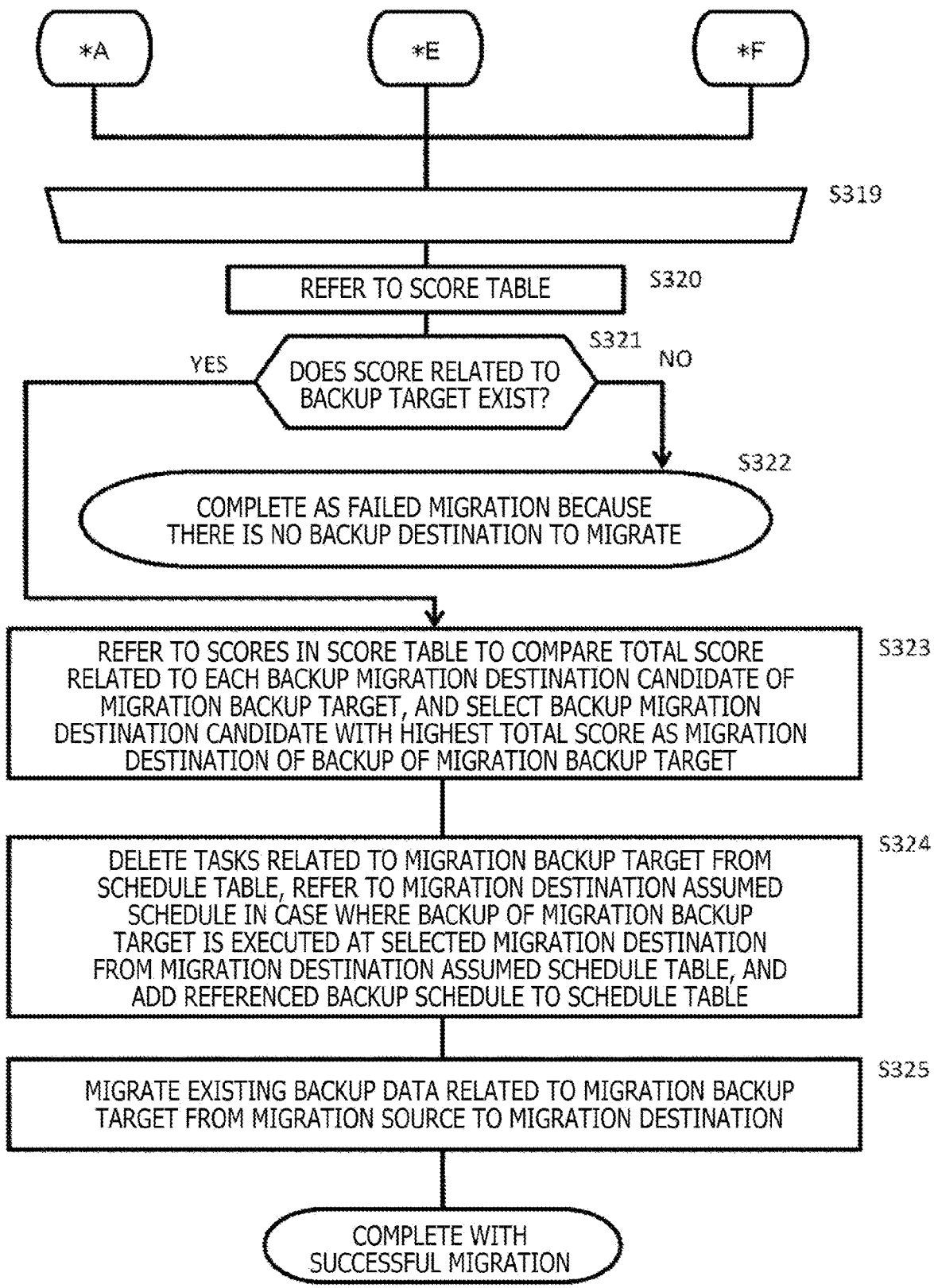
FIG. 18E is a flowchart for showing the backup migration processing (part 5)

When the adjustment processing of the backup schedule has been completed with failed adjustment, the backup management device 100 excludes the backup migration destination candidate from the candidates (S304→S319 in FIG. 18E).

When the adjustment processing of the backup schedule has been completed with successful adjustment, the backup management device 100 adds the migration destination assumed schedule to the migration destination assumed backup schedule table 205, refers to the backup storage period of the migration backup target from the backup requirement table 201, calculates the assumed number of full backups and the assumed maximum differential data accumulation amount related to the migration backup target from the migration destination assumed schedule and the backup storage period, and adds them to the migration destination assumed backup information table 204 (S305→S306 in FIG. 18B).

Here, the assumed number of full backups is the number [piece] of full backups among the backups assumed to be executed within the storage period (the execution period of the backups assumed to be executed according to the migration destination assumed schedule) counting from the oldest existing backup in the migration destination assumed schedule. In addition, the assumed maximum differential data accumulation amount is the value [GB] of the differential data accumulation amount at the time when the capacity of the differential data accumulation from the latest full backup is the largest among the differential backups assumed to be executed within the storage period (same as above) counting from the oldest existing backup in the migration destination assumed schedule.

After S305, the backup management device 100 determines whether the backup migration destination candidate is a storage device or a cloud area (S306), and the processing moves to S307 when the backup migration destination candidate is a storage device (S306: storage device), and the processing moves to S308 when the backup migration destination candidate is a cloud area (S306: cloud area).

When the backup migration destination candidate is a storage device, the backup management device 100 refers to the capacity reduction performance, the basic consumed memory, and the capacity-dependent consumed memory related to the backup migration destination candidate from the backup destination specification table 200 (S307→S309 in FIG. 18C).

When the backup migration destination candidate is a cloud area, the backup management device 100 refers to the capacity-dependent cloud cost related to the backup migration destination candidate from the backup destination specification table 200 (S308→S315 in FIG. 18D).

After S307, the backup management device 100 calculates the predicted consumed capacity resource in the case where the backup of the migration backup target is executed by the backup migration destination candidate, on the basis of the current total full backup capacity, the current total differential backup capacity, the average full backup capacity, the assumed number of full backups, and the assumed maximum differential data accumulation amount related to the migration backup target, and the capacity reduction performance related to the backup migration destination candidate, and adds the predicted consumed capacity resource thus calculated to the predicted resource consumption table (S309).

The predicted consumed capacity resource is calculated by the following (Equation 1).

$$\text{(predicted consumed capacity resource) [GB]} = \\
\{\text{(current total full backup capacity) [GB]} + \\
\text{(current total differential backup capacity) [GB]} + \\
\text{(average full backup capacity) [GB/piece]} \times \\
\text{(assumed number of full backups) [piece]} + \\
\text{(assumed maximum differential data accumulation amount) [GB/piece]} \times \\
\text{(assumed number of full backups) [piece]}\} \times \\
\text{(capacity reduction performance) [\%]}$$

(Equation 1)

Here, the first term and the second term of (Equation 1) represent the total capacity of the existing backup data, and the third term to the sixth term represent the capacity that is assumed to be consumed along with the future backup schedule within the backup storage period. In addition, the (capacity reduction performance) is multiplied in order to calculate the capacity reduced by the function of the storage device.

Next, the backup management device 100 calculates the predicted maximum consumed memory in the case where the backup of the migration backup target is executed by the backup migration destination candidate, on the basis of the assumed maximum differential data accumulation amount related to the migration backup target, and the basic consumed memory and the capacity-dependent consumed memory related to the backup migration destination candidate, and stores the predicted maximum consumed memory thus calculated in the predicted resource consumption table 206 (S310).

The predicted maximum consumed memory is calculated by the following (Equation 2).

$$\text{(predicted maximum consumed memory) [GB]} = \\
\text{(assumed maximum differential data accumulation amount) [GB]} \times \\
\text{(capacity-dependent consumed memory) [GB/GB]} + \\
\text{(basic consumed memory) [GB]}$$

(Equation 2)

The (predicted maximum consumed memory) in (Equation 2) is the memory when the memory consumption is the largest at the time of restoration of the backup destination, and is the consumed memory at the time when the calculation cost for restoration is the largest among the differential backups stored along with the future backup schedule within the backup storage period.

In addition, the meaning of the assumed maximum differential data accumulation amount is as described above, and this capacity is included in (Equation 2) to consider the capacity at the time when the calculation cost for restoration is the largest.

Next, the backup management device 100 refers to the maximum capacity resource, the current consumed capacity resource, the maximum memory, the current consumed memory, and the unique correction score related to the backup migration destination candidate from the backup destination specification table 200 (S311).

Next, on the basis of the predicted consumed capacity resource in the case where the backup of the migration backup target is executed by the backup migration destination candidate, the maximum capacity resource and the current consumed capacity resource related to the backup migration destination candidate, the capacity resource scores related to the migration backup target and the backup migration destination candidate are calculated and stored in the score table 207 (S312).

The capacity resource score is calculated by the following (Equation 3).

$$\text{(capacity resource score)} = \\
Fc \text{ (predicted consumed capacity resource [GB],} \\
\text{maximum capacity resource [GB],} \\
\text{current consumed capacity resource [GB])}$$

(Equation 3)

Here, $Fc()$ is a capacity score calculation function and is represented by, for example, a value obtained by subtracting the predicted consumed resource capacity from the remaining resource capacity in the storage device 50 as the following (Equation 4).

$$Fc \text{ (predicted consumed capacity resource [GB],} \\
\text{maximum capacity resource [GB],} \\
\text{current consumed capacity resource [GB])} =$$

(Equation 4)

-continued $$\{(\text{maximum capacity resource}) [GB] -$$
$$(\text{currrent consumed capacity resource}) [GB] -$$
$$(\text{predicted consumed capacity resource}) [GB]\} \times Kc \ [/GB]$$

Here, Kc is (scoring factor related to capacity resource) per capacity and is, for example, 1.

Next, on the basis of the predicted maximum consumed memory in the case where the backup of the migration backup target is executed by the backup migration destination candidate, and the maximum memory and the current consumed memory related to the backup migration destination candidate, the backup management device 100 calculates the calculation resource scores related to the migration backup target and the backup migration destination candidate, and stores the calculation resource scores thus calculated in the score table (S313).

The calculation resource score is calculated by the following (Equation 5).

$$\text{(calculation resource score)} = \qquad \text{(Equation 5)}$$
$$Fp \ (\text{predicted maximum consumed memory } [GB],$$
$$\text{maximum memory } [GB], \text{current consumed memory } [GB]$$

Here, Fp ( ) is a calculation resource score calculation function and is represented by, for example, a value obtained by subtracting the predicted consumed memory amount from the remaining memory amount in the storage device 50 as the following (Equation 6).

$$\qquad\qquad\qquad\qquad\qquad\qquad\qquad\qquad \text{(Equation 6)}$$
$$Fp \ (\text{predicted maximum consumed memory } [GB],$$
$$\text{maximum memory } [GB], \text{current consumed memory } [GB]) =$$
$$\{(\text{maximum memory}) [GB] - (\text{current consumed memory}) [GB] -$$
$$(\text{predicted maximum consumed memory}) [GB]\} \times Kp \ [/GB]$$

Here, Kp is (scoring factor related to calculation resource) per memory amount and is, for example, 1.

Next, on the basis of the capacity resource scores and the calculation resource scores related to the migration backup target and the backup migration destination candidate and the unique correction score related to the backup migration destination candidate, the backup management device 100 calculates the total score related to the migration backup target and the backup migration destination candidate, and stores the total score thus calculated in the score table 207 (S314).

The total score in the storage device 50 is calculated by the following (Equation 7).

$$\qquad\qquad\qquad\qquad\qquad\qquad\qquad\qquad \text{(Equation 7)}$$
$$\text{(total score)} = \text{(capacity resource score)} +$$
$$\text{(calculation resource score)} + \text{(unique correction score)}$$

After S308, the backup management device 100 calculates the predicted cloud cost in the case where the backup of the migration backup target is executed by the backup migration destination candidate, on the basis of the current total full backup capacity, the current total differential backup capacity, the average full backup capacity, the assumed number of full backups, and the assumed maximum differential data accumulation amount related to the migration backup target, and the capacity-dependent cloud cost related to the backup migration destination candidate, and adds the predicted cloud cost thus calculated to the predicted resource consumption table 206 (S315).

The predicted cloud cost is calculated by the following (Equation 8).

$$\qquad\qquad\qquad\qquad\qquad\qquad\qquad\qquad \text{(Equation 8)}$$
$$(\text{predicted cloud cost}) [\text{yen/month}] =$$
$$\{(\text{current total full backup capacity}) [GB] +$$
$$(\text{current total differential backup capacity}) [GB] +$$
$$(\text{average full backup capacity}) [GB/\text{piece}] \times$$
$$(\text{assumed number of full backups}) [\text{piece}] +$$
$$(\text{assumed maximum differential data accumulation amount}) [GB/\text{piece}] \times$$
$$(\text{assumed number of full backups}) [\text{piece}]\} \times$$
$$(\text{capacity-dependent cloud cost}) [\text{yen/month} * GB]$$

Here, the first term and the second term of (Equation 8) represent the total capacity of the existing backup data, and the third term to the sixth term represent the capacity that is assumed to be consumed along with the future backup schedule within the backup storage period. In addition, the (capacity-dependent cloud cost) is multiplied to convert the assumed total capacity into the cost per month (cloud service usage cost) in the cloud area.

Next, the backup management device 100 refers to the upper-limit cloud cost, the current consumed cloud cost, and the unique correction score related to the backup migration destination candidate from the backup destination specification table 200 (S316).

Next, on the basis of the predicted cloud cost in the case where the backup of the migration backup target is executed by the backup migration destination candidate, and the upper-limit cloud cost and the current consumed cloud cost related to the backup migration destination candidate, the cloud cost scores related to the migration backup target and the backup migration destination candidate are calculated and stored in the score table 207 (S317).

The cloud cost score is calculated by the following (Equation 9).

$$\qquad\qquad\qquad\qquad\qquad\qquad\qquad\qquad \text{(Equation 9)}$$
$$(\text{cloud cost score}) = Fcc \ (\text{predicted cloud cost (yen/month)},$$
$$\text{upper-limit cloud cost (yen/month)}, \text{current cloud cost [yen/month]})$$

Here, Fcc ( ) is a cloud cost score calculation function and is represented by, for example, a value obtained by subtracting the predicted cost from the remaining allowable cost per month that can be used in the cloud area 30 as the following (Equation 10).

$$F_{cc} \text{ (predicted cloud cost [yen/month],}$$
$$\text{upper-limit cloud cost [yen/month], current cloud cost [yen/month])} =$$
$$\{(\text{upper-limit cloud cost}) \text{ [yen/month]} -$$
$$(\text{current cloud score}) \text{ [yen/month]} -$$
$$(\text{predicted cloud cost}) \text{ [yen/month]}\} \times K_{cc} \text{ [month/yen]}$$

(Equation 10)

Here, Kcc is (scoring factor related to cloud cost) per capacity in the cloud area and is, for example, 0.01.

Next, on the basis of the cloud cost scores related to the migration backup target and the backup migration destination candidate and the unique correction score related to the backup migration destination candidate, the backup management device 100 calculates the total scores related to the migration backup target and the backup migration destination candidate, and stores the calculated total scores in the score table 207 (S318).

The total score in the cloud area 30 is calculated by the following (Equation 11).

$$(\text{total score}) = (\text{cloud cost score}) + (\text{unique correction score}) \quad \text{(Equation 11)}$$

After executing S304, S314, and S318, the processing reaches S319, and the loop is repeated by returning to S300.

When exiting the loop of S300 to S319, the backup management device 100 refers to the score table 207 (S320) to determine whether or not a score related to the backup target exists (S321), and the processing moves to S323 when a score related to the backup target exists (S321: YES), and the processing moves to S322 when a score related to the backup target does not exist (S321: NO).

When a score related to the backup target does not exist, the backup management device 100 completes the processing with failed migration because there is no backup destination to migrate (S322).

When a score related to the backup target exists, the backup management device 100 refers to the scores in the score table 207 to compare the total score related to each backup migration destination candidate of the migration backup target, and selects the backup migration destination candidate with the highest total score as the migration destination of the backup of the migration backup target (S323).

Next, the backup management device 100 deletes the tasks related to the migration backup target from the schedule table, refers to the migration destination assumed schedule in the case where the backup of the migration backup target is executed at the selected migration destination from the migration destination assumed backup schedule table 205, and adds the referenced schedule to the backup schedule table 203 (S324).

Next, the backup management device 100 migrates the existing backup data related to the migration backup target from the migration source storage device to the migration destination (S325), and completes with successful migration.

Next, an example of a user interface provided by the backup management device will be described using FIG. 19.

Figure 19:
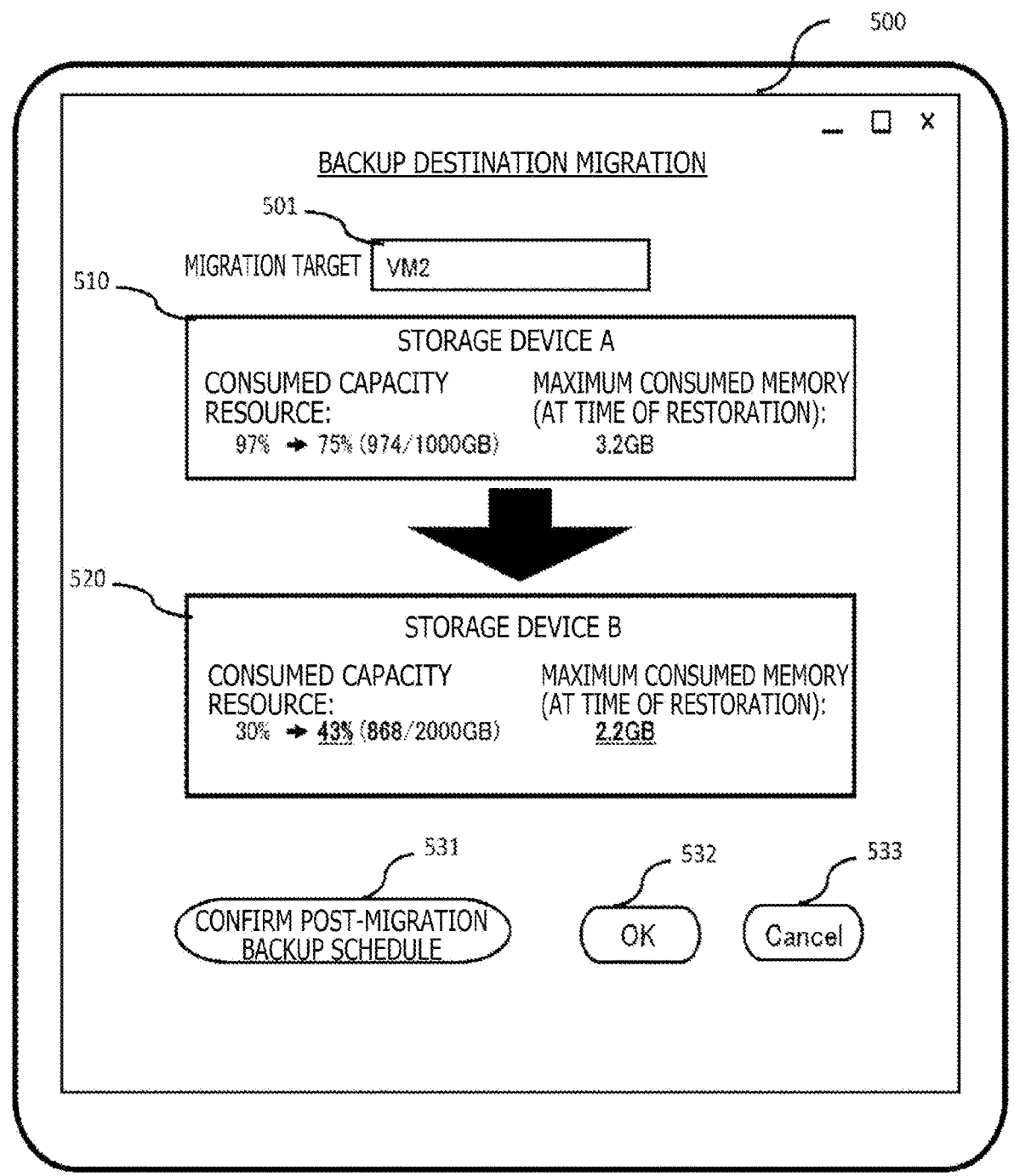
FIG. 19 is a diagram for showing an example of a backup migration destination utility screen.

The backup management device 100 can present the results calculated for the backup destination migration to the administrator through a backup migration destination utility screen 500 as shown in FIG. 19.

The backup migration destination utility screen 500 has items of a migration target display area 501, an existing backup destination display area 510, a backup migration destination display area 520, a "post-migration backup schedule confirmation" button 531, an OK button 532, and a cancel button 533.

In the migration target display area 501, the name or ID of the VM or the physical server as the migration backup target is displayed.

In the existing backup destination display area 510, information of the current backup destination for the migration backup target is displayed. In the example of FIG. 19, the values before and after migration of the consumed capacity resource and the value of the maximum consumed memory in the "storage device A" are displayed.

In the backup migration destination display area 520, information of the backup destination that has become the migration destination is displayed. In the example of FIG. 19, the values before and after migration of the consumed capacity resource and the value of the maximum consumed memory in the "storage device B" are displayed.

In addition, although not illustrated, when the "post-migration backup schedule confirmation" button 531 is clicked, a window for showing post-migration backup schedule information is displayed. When the OK button 532 is clicked, the migration of the backup destination calculated by the backup management device 100 is established, and when the cancel button 533 is clicked, the migration of the backup destination is canceled.

As described above, according to the backup management device of the present embodiment, for the backup destination as a candidate for the migration destination, the total scores of the storage devices and the cloud areas are calculated to select an appropriate migration destination on the basis of the capacity score related to the capacity, the calculation resource score related to the calculation performance, and the unique correction score considering special circumstances related to each storage device and cloud area.

Accordingly, when data of a real machine or a virtual machine is backed up, the cost required to change the configuration of the system and the burden on the administrator can be reduced, the device capacity at the backup destination can effectively be utilized, and the backup processing can be optimized.

What is claimed is:

1. A backup management device that selects a backup destination when backing up data of a backup target including a virtual machine or a physical server to a backup destination including a storage device or a cloud area, the backup management device comprising:
a backup requirement table that holds backup requirement information;
a backup specification table that holds information related to a capacity resource or calculation performance of the backup destination;
an existing backup information table that holds a backup capacity collected from the backup destination; and
a backup schedule table that holds information related to a task of backing up the data of the backup target to the backup destination,
wherein the backup requirement table, the backup specification table, and the backup schedule table are referred to, and,
when conditions related to the capacity resource specified in the backup requirement table cannot be satisfied when the data is backed up to the backup destination for the task of the backup target of the backup schedule table,
predicted resource consumption when the data of the backup target in the task is backed up to each of other backup destinations is calculated by referring to the existing backup information table,
a score representing a low impact on the resource when migrating to each of the other backup destinations is calculated on a basis of the predicted resource consumption, and
a backup destination as a migration destination of the backup related to the task is determined on a basis of the score, and the backup schedule table is updated such that the determined backup destination becomes the backup destination related to the task.

2. The backup management device according to claim 1, wherein, when the backup destination is a storage device, the score is calculated on a basis of a capacity resource score representing a low impact on a capacity resource of the storage device and a calculation resource score representing a low impact on a calculation resource of the storage device, and,
when the backup destination is a cloud area, the score is calculated on a basis of a cloud cost score representing a low impact on a cost charged in the cloud area.

3. The backup management device according to claim 2, wherein the capacity resource score is calculated on a basis of a calculated predicted consumed capacity resource, a maximum capacity resource held by the backup specification table, and a current consumed capacity resource.

4. The backup management device according to claim 3, wherein the capacity resource score is calculated on a basis of a value obtained by subtracting the current consumed capacity resource and the predicted consumed capacity resource from the maximum capacity resource.

5. The backup management device according to claim 2, wherein the calculation resource score is calculated on a basis of a calculated predicted maximum consumed memory, a maximum memory held by the backup specification table, and a current consumed memory.

6. The backup management device according to claim 5, wherein the calculation resource score is calculated by a value obtained by subtracting the current consumed memory and the predicted maximum consumed memory from the maximum memory.

7. The backup management device according to claim 1, wherein the score is calculated on a basis of a unique correction score defined for each of the backup destinations.

8. A backup destination migration method performed by a backup management device that selects a backup destination when backing up data of a backup target including a virtual machine or a physical server to a backup destination including a storage device or a cloud area,
the backup management device including
a backup requirement table that holds backup requirement information,
a backup specification table that holds information related to a capacity resource or calculation performance of the backup destination,
an existing backup information table that holds a backup capacity collected from the backup destination, and
a backup schedule table that holds information related to a task of backing up the data of the backup target to the backup destination,
the backup destination migration method comprising:
referring to the backup requirement table, the backup specification table, and the backup schedule table;
determining whether or not conditions related to the capacity resource specified in the backup requirement table can be satisfied when the data is backed up to the backup destination for the task of the backup target of the backup schedule table;
calculating predicted resource consumption when the data of the backup target in the task is backed up to each of other backup destinations, by referring to the existing backup information table, when the conditions related to the capacity resource specified in the backup requirement table cannot be satisfied when the data is backed up to the backup destination for the task of the backup target of the backup schedule table;
calculating a score representing a low impact on the resource when migrating to each of the other backup destinations on a basis of the predicted resource consumption; and
determining a backup destination as a migration destination of the backup related to the task on a basis of the score and updating the backup schedule table such that the determined backup destination becomes the backup destination related to the task,
wherein, when the backup destination is a storage device, the score is calculated on a basis of a capacity resource score representing a low impact on a capacity resource of the storage device and a calculation resource score representing a low impact on a calculation resource of the storage device,
when the backup destination is a cloud area, the score is calculated on a basis of a cloud cost score representing a low impact on a cost charged in the cloud area,
the capacity resource score is calculated on a basis of a calculated predicted consumed capacity resource, a maximum capacity resource held by the backup specification table, and a current consumed capacity resource, and
the calculation resource score is calculated on a basis of a calculated predicted maximum consumed memory, a maximum memory held by the backup specification table, and a current consumed memory.

9. The backup destination migration method according to claim 8,
wherein the capacity resource score is calculated on a basis of a value obtained by subtracting the current consumed capacity resource and the predicted consumed capacity resource from the maximum capacity resource.

10. The backup destination migration method according to claim 8,
wherein the calculation resource score is calculated by a value obtained by subtracting the current consumed memory and the predicted maximum consumed memory from the maximum memory.

11. The backup destination migration method according to claim 8,
wherein the score is calculated on a basis of a unique correction score defined for each of the backup destinations.

* * * * *